(12) United States Patent
Sugawara et al.

(10) Patent No.: US 7,364,309 B2
(45) Date of Patent: Apr. 29, 2008

(54) IMAGE PROJECTOR AND IMAGE PROJECTING METHOD

(75) Inventors: Yutaka Sugawara, Tokyo (JP); Naoya Eguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 10/486,055

(22) PCT Filed: Jun. 10, 2003

(86) PCT No.: PCT/JP03/07372

§ 371 (c)(1), (2), (4) Date: Feb. 15, 2005

(87) PCT Pub. No.: WO03/104892

PCT Pub. Date: Dec. 18, 2003

(65) Prior Publication Data
US 2005/0128578 A1 Jun. 16, 2005

(30) Foreign Application Priority Data
Jun. 10, 2002 (JP) ............................ 2002-169238

(51) Int. Cl.
*G03B 21/14* (2006.01)
(52) U.S. Cl. .......................................... 353/85; 353/97
(58) Field of Classification Search ................ 353/85, 353/97, 122
See application file for complete search history.

(56) References Cited

U.S. PATENT DOCUMENTS 5,117,221 A    5/1992  Mishica, Jr.
6,002,505 A *  12/1999 Kraenert et al. ............ 359/196
6,361,173 B1 *  3/2002 Vlahos et al. ................ 353/97
6,460,999 B1 * 10/2002 Suzuki ........................ 353/79
6,945,653 B2 *  9/2005 Kobori et al. ................ 353/30
6,984,039 B2 *  1/2006 Agostinelli ................... 353/28
2001/0005262 A1 6/2001 Tsurushima

FOREIGN PATENT DOCUMENTS

JP          4-111585         4/1992
JP          5-8556           2/1993

(Continued)

*Primary Examiner*—William C. Dowling
(74) *Attorney, Agent, or Firm*—Frommer Lawrence & Haug LLP; William S. Frommer; Thomas F. Presson

(57) ABSTRACT

In an image projection on a screen, an image projection apparatus improves the safety of entry into a projection region by the human body and does not bring about the increase of complexity of the configuration thereof owing to the improvement of the safety. A monitoring area is regulated on the outside of the projection area (3) of the screen (2). A detection wave such as infrared rays is emitted from a detection wave source (1c) of the image projection apparatus (1). A reflection wave from the monitoring area is detected by reflection wave detection means (1d) such as a CCD sensor. Whether the human body or an obstacle enters the monitoring space, which is surrounded by a detection wave (4) between the main body unit of the image projection apparatus (1) and the screen (2), or not is detected. Once the entry is detected, the intensity of the radiation light traveling toward the projection area (3) is reduced or cut off according to the situation or the degree of the entry.

16 Claims, 20 Drawing Sheets

FOREIGN PATENT DOCUMENTS

| | | |
|---|---|---|
| JP | 2001 75170 | 3/2001 |
| JP | 2002-6397 | 1/2002 |
| JP | 2002-196301 | 7/2002 |
| JP | 2002-196415 | 7/2002 |
| JP | 2002-196416 | 7/2002 |

* cited by examiner

ALMOST PARALLEL RAYS

CROSSED RAYS

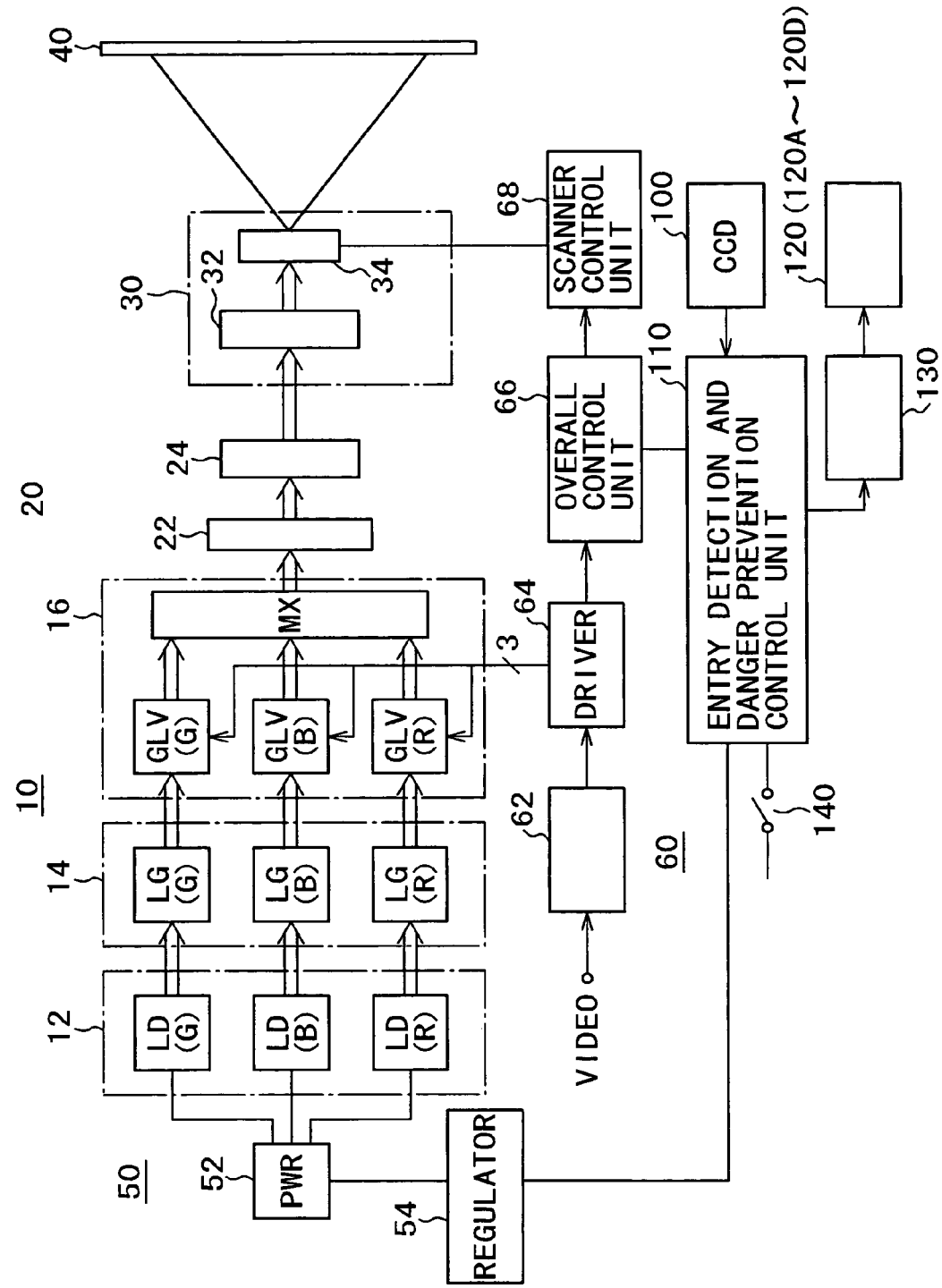

d1=30cm
d2=20cm
d3=20cm
d4=40cm d1=10cm
d2=20cm
d3=10cm
d4=40cm d1=10cm
d2=10cm
d3=10cm
d4=10cm

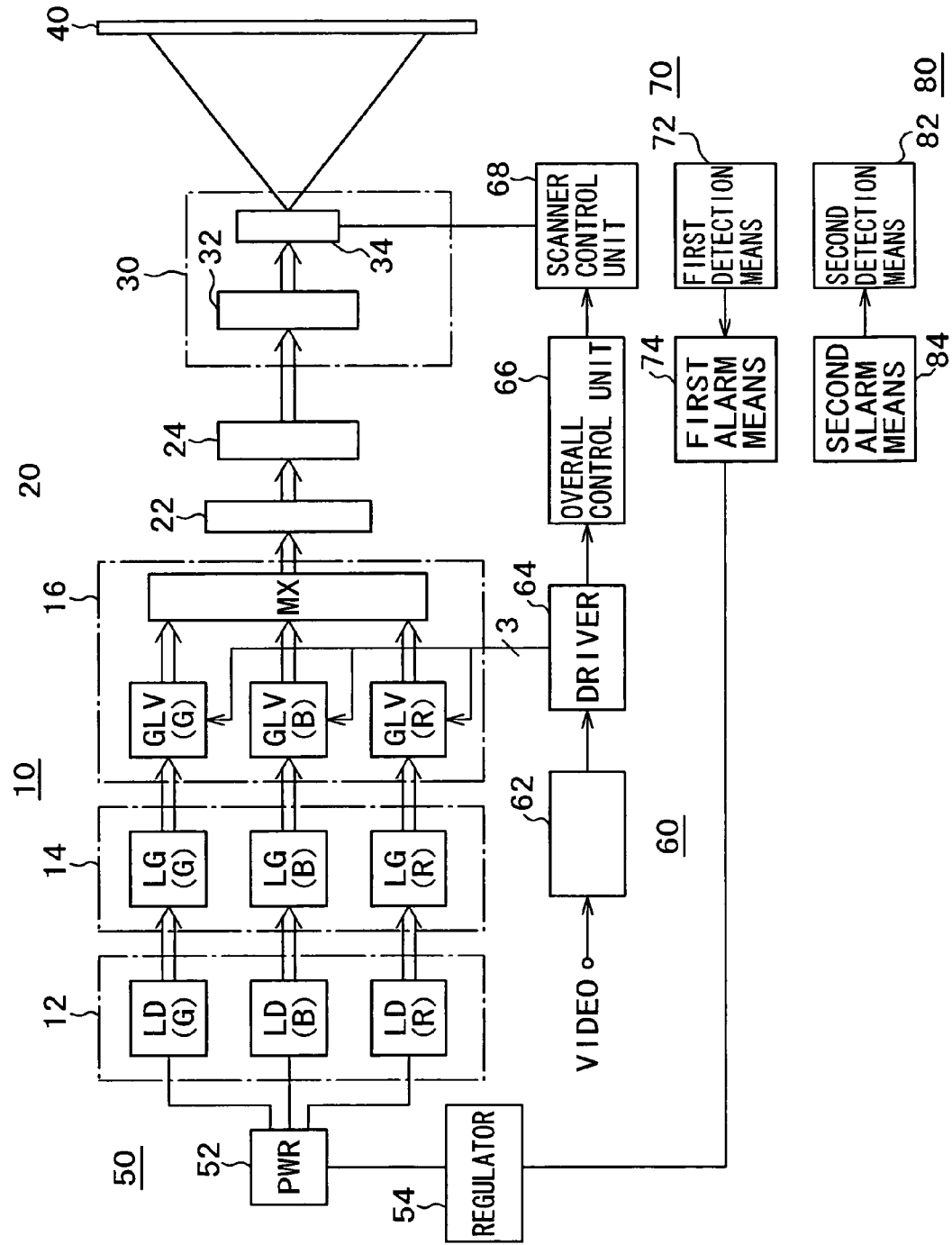

IMAGE PROJECTOR AND IMAGE PROJECTING METHOD

TECHNICAL FIELD

The present invention relates to a technique for taking a sufficient safety measure in an image projection apparatus and an image projection method which are constituted by using a high intensity light source.

BACKGROUND ART

As an image display apparatus capable of large screen display, a projection type projector apparatus is known. A viewer can view a projected image by projecting light from a light source onto a screen.

As a light source of a projector apparatus, a high luminance projection tube has been used until now. However, with the object of the improvement of brightness, color reproducibility and the like, the object of the easiness of modulation by an image signal, and the other objects, a projection system using the laser light sources of red (R), green (G) and blue (B) has been proposed.

In the mean time, when a laser light is used, the securement of the safety thereof is an important task. For example, it is needed to take an enough measure against the case where a viewer carelessly enters the projection area of the laser light. That is, a danger in the case where a laser light directly entered the eye is pointed out. As the safety measure thereof, various apparatus having the function of detecting entry into the projection area of the laser light by a person or the like to cut off the projection of the laser light has been proposed (for example, see Japanese Unexamined Patent Publication No. Hei 4-111585, Published Japanese Translation of PCT Application No. Hei 11-501419, Japanese Unexamined Patent Publication No. 2001-249399).

Now, the conventional apparatus have the problems caused by taking such a safety measure. The problems are, for example, that the configuration of an apparatus becomes complicated; that such a measure interferes with making the size of an apparatus larger; and the like.

That is, a safety mechanism for the safety of the human body is indispensable for an apparatus attaching importance to the safety. However, when the attachment of the safety mechanism brings about disadvantages such as the growth of the complexity of a projection optical system and the like, a remarkable rise of an apparatus cost, and the like, it is apprehended that the disadvantages cause a hindrance of diffusion and the like. Moreover, no delay of the operation of the safety mechanism is allowed, and the rapidity of entry detection is required.

Accordingly, the present invention aims to improve the safety of an image projection apparatus including the function of projecting an image on a screen to display the image thereon in the case where the human body or the like enters the projection region of a radiation light, and not to bring about the increase of the complexity of the configuration of the apparatus, and the like owing to the improvement of the safety.

DISCLOSURE OF THE INVENTION

For solving the problem, an image projection apparatus according to the present invention is constituted to include: a detection wave source provided on an opposed surface of an apparatus main body unit to a screen or on the screen; and reflection wave detection means for detecting a reflection wave reflected on a monitoring area located on an outside of a projection area on the screen at a distance after a detection wave has been emitted from the detection wave source toward the monitoring area, whereby entry into a monitoring space surrounded by the detection wave is detected on a basis of a result of a comparison of a detected level by the reflection wave detection means with a prescribed threshold value or a reference region.

Moreover, an image projection method according to the present invention regulates a monitoring area located on an outside of a projection area on a screen apart from the projection area, the screen located at a distance from an image projection apparatus, and emits a detection wave from a detection wave source provided on a front surface of the image projection apparatus toward the monitoring area, and further detects entry into a monitoring space surrounded by the detection wave by detecting a reflection wave from the monitoring area, and thereby cut offs light radiated toward the projection area or reduces intensity of the light according to an entry state.

Consequently, according to these inventions, a detection wave source opposed to a screen is provided, and a reflection wave emitted from the detection wave source and reflected from a monitoring area is detected. Accordingly, entry into a monitoring space can be detected with a simple configuration. Then, when the entry into the monitoring space is detected, it is possible to prevent the human body from being exposed to danger by cutting off a radiation light to a projection area or by reducing light intensity.

BRIEF DESCRIPTION OF THE DRAWINGS

FIG. 9 is a view showing a configuration example of a projection system;

FIG. 14 is a view showing another example of the configuration of the projection system;

BEST MODE FOR CARRYING OUT THE INVENTION

The present invention aims to secure safety by immediately cutting off light or reducing light intensity when an obstacle enters the projection area of a radiation light (such as a laser light or the like) in an image projection apparatus.

Figure 1:
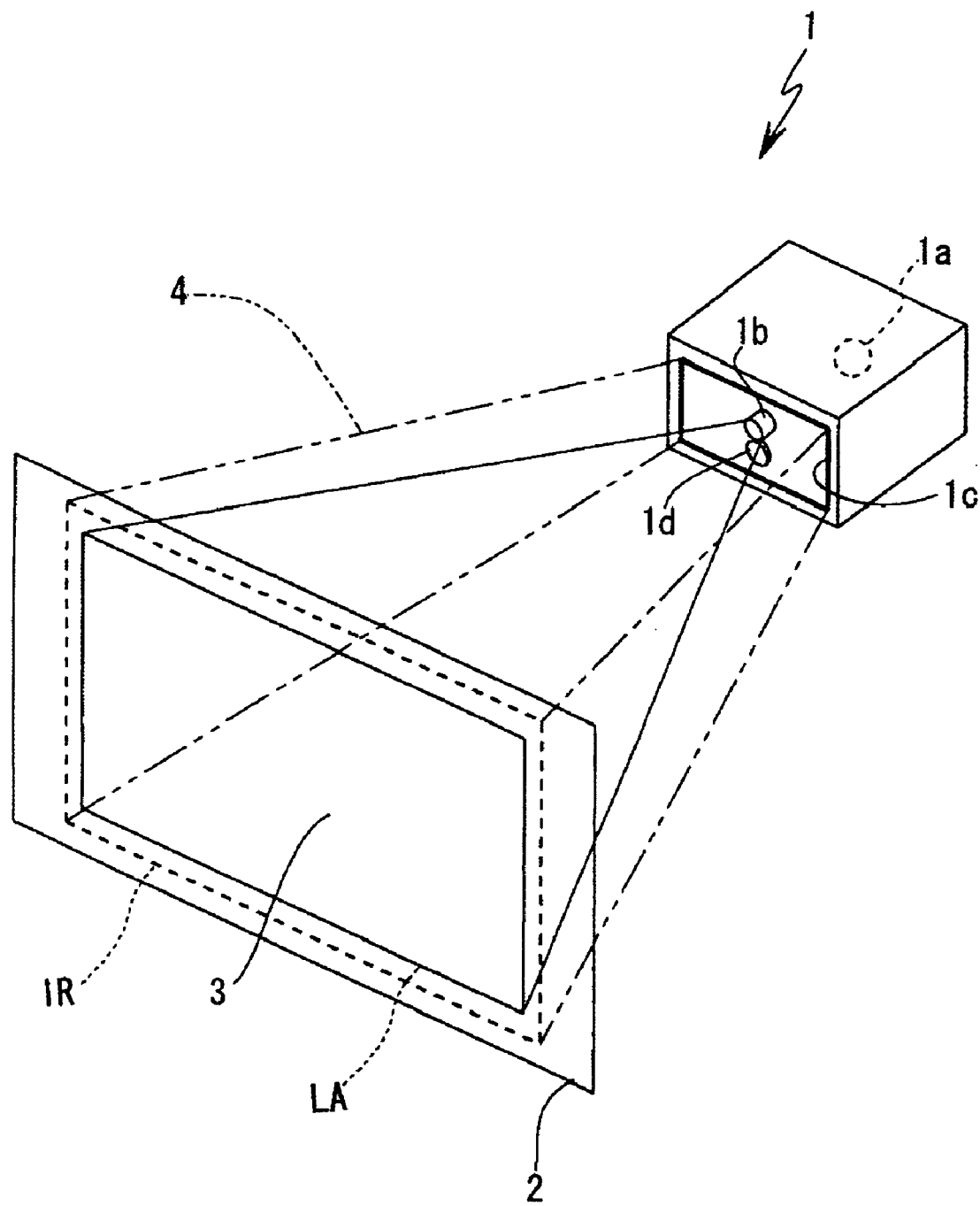
FIG. 1 is a schematic view showing a basic configuration example of an image projection apparatus according to the present invention.

FIG. 1 schematically shows a basic configuration example of an image projection apparatus according to the present invention, and shows an example of an apparatus using a laser light source (a laser projector apparatus and the like).

An image projection apparatus 1 includes a light source 1a for performing image display by projection to a projection area 3 on a screen 2 located at a fixed distance from an apparatus main body unit, and a projection unit 1b including a projection lens. For example, a configuration which is provided with laser light sources (the laser light source of each color of R, G and B) and an optical modulator (modulation means) and includes the function of projecting an image on the screen 2 by the use of the laser lights is known. Incidentally, the optical modulator is provided with a modulator, which modulates the laser light of each color of R, G and B according to an image signal and an optical system. The laser lights are modulated according to the image signal, and scanning (a sweep) is performed by means of, for example, a galvanometer mirror or the like constituting optical sweep means. Moreover, the optical modulator is provided with a projection optical system including an objective lens for projecting the laser light of each color on the screen 2. The laser light of each color swept by the optical sweep means is irradiated on the screen 2 through the projection optical system. Incidentally, the present invention can be applied not only to the projector apparatus in the form of modulating illumination lights by means of an image signal while projecting the modulated lights on the screen, however also to projector apparatuses having various configuration forms.

Incidentally, as the light source 1a, the configuration using an electric discharge lamp, an arc tube or the like, which have high light intensity or high luminance can be cited, however, in particular, the configuration form using laser light sources has superior characteristics in brightness or color reproducibility as compare to the configuration using the projection tube or the like, and by the configuration form using the laser light sources, the modulation of an image signal is easy. However, as described above, in the case where the laser light sources are used, it is needed to take a safety measure against the entry into the radiation light passing area, which is from the projection unit 1b to the projection area 3 on the screen, by the human body or the like (for example, the cut off of the laser lights, the reducing of the light intensity, or the like).

In FIG. 1, a rectangular frame "LA" indicated by a full line on the screen 2 indicates the outline frame of the projection area 3 of the laser lights. In the area, an image is projected to be displayed.

The image projection apparatus 1 is equipped with a safety mechanism for the prevention of danger on the human body (such as the mechanism for preventing the direct entering of the laser lights to the eye, or the like) even when, for example, a viewer carelessly enters the irradiated region of the laser lights toward the projection area 3. In entry detection to a setting area (monitoring space), the image projection apparatus 1 utilizes a detection wave to detect the reflection wave of the detection wave. Then, when entry into the area by a person or the like is detected, the image projection apparatus 1 cut offs the radiation lights to the projection area 3, or reduces the intensity of the radiation lights sufficiently (the image projection apparatus 1 prevents the influence of the light to the eyes of the person).

Entry detection means using the detection wave includes a detection wave source 1c and reflection wave detection means 1d.

The detection wave source 1c is provided on the front surface of the apparatus main body unit opposed to the screen 2 or on the screen. As the detection wave source 1c, for example, a safe light source such as a light emitting diode (LED) can be used as a light emission source of infrared light or infrared rays (even when the infrared light enters the eyes of a viewer, no safety problems are caused).

A detection wave 4 emitted by the detection wave source 1c (see two-dot chain lines in FIG. 1) is irradiated toward the screen 2. In FIG. 1, a rectangular frame IR shown by a broken line on the screen 2 indicates the projection area of the detection wave. In the present embodiment, the projection area is a quadrilateral area which is located on the outside of the projection area 3 of the laser lights and is formed to be a size larger than the area. Incidentally, the reason why the projection area (the rectangular frame IR) of the detection wave is set to be larger than the projection area 3 of the laser lights in size (an angle of view) is that it is necessary to detect the entry into the projection area 3 by a viewer or the like before the entry.

The reflection wave detection means 1d is provided for detecting reflection waves of the detection wave from the screen. That is, after the detection wave has been emitted from the detection wave source 1c toward a prescribed area (see a monitoring area 6 in FIG. 2) located separately on the outside of the projection area 3, the reflection wave detection means 1d detects the reflection waves reflected in the area. When, for example, infrared light or infrared rays are used as the detection wave, an image sensor (such as a charge coupled device (CCD) type image sensor, a complementary metal-oxide semiconductor (CMOS) type image sensor, or the like) can be cited as the reflection wave sensor of the detection wave.

Incidentally, the detection wave source 1c and the reflection wave detection means 1d are arranged around the projection unit 1b provided on the surface opposed to the screen 2 (the front surface of the apparatus main body unit). As shown in the present embodiment, in case of the configuration in which the reflection wave detection means 1d is located in the neighborhood of the projection unit 1b and the detection wave source 1c is arranged so as to surround them, the configuration is advantageous for the miniaturization and the compactification of the apparatus. Moreover, by providing the reflection wave detection means 1d at a position near the projection unit 1b, the occurrence probability of erroneous detection and the like can be reduced (for example, when the reflection wave detection means 1d is too distant from the projection unit 1b, detection unrelated to the projection is performed. If entry detection responds to the unrelated detection, the possibility that the safety mechanism unnecessarily operates is produced). In addition, by the use of the method of modulating the detection wave, and the like, it is possible to heighten the precision of detection, or to prevent erroneous detection.

Figure 2:
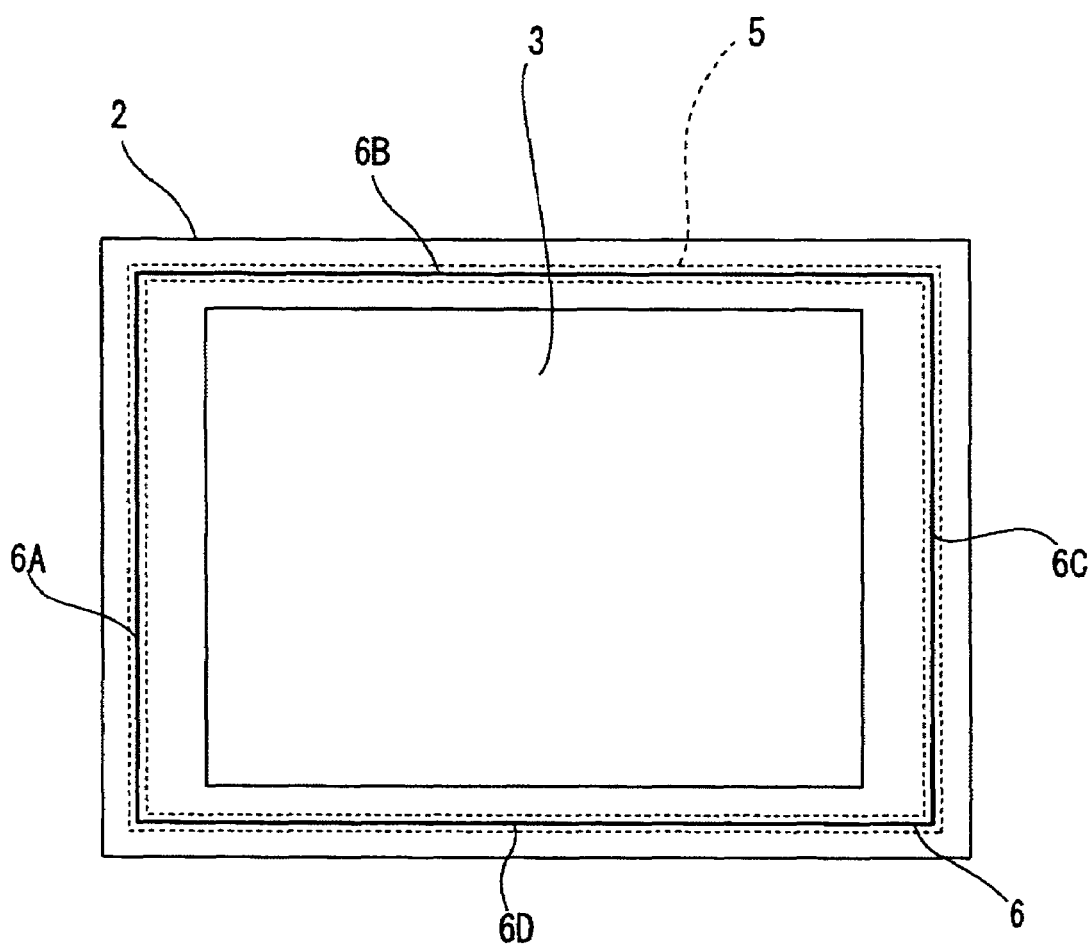
FIG. 2 is an explanatory view exemplifying each of projection areas and monitoring areas on a screen.

FIG. 2 exemplifies the relation among the projection area 3 of the laser lights, a projection area 5 (shown by a region indicated by broken lines) of the detection wave and the monitoring area 6 on the screen 2.

The monitoring area 6 is set at a position almost corresponding to the projection area 5, however the width of the monitoring area 6 is set to be narrower than that of the projection area 5. In the present embodiment, the monitoring area 6 is composed of four areas 6A-6D which severally have a prescribed width and correspond to each side of the rectangular frame (a quadrilateral) severally. However, the monitoring area 6 is not limited to such a shape. It is possible to implement the present invention in various forms using at least one or more sides of monitoring areas.

Among each of the areas 6A-6D shown in FIG. 2, the area 6A constitutes the left side part of the quadrilateral; the area 6B constitutes the upper side part of the quadrilateral; the area 6C constitutes the right side part of the quadrilateral; and the area 6D constitutes the lower side part of the quadrilateral. Then, with regard to each configuration area, monitoring is performed correspondingly to each configuration area on the basis of acquisition data pertaining to a region (a detection region) detected by the reflection wave detection means 1d. For example, in the case where a reflection wave sensor, an image sensor or the like of infrared light or infrared rays is used, entry monitoring is performed by a process using pixel data constituting the detected image of each of the configuration areas.

Incidentally, the distance from the external shape frame LA of the projection area 3 to the monitoring area 6 (see a letter "W" in FIG. 3) is determined on the basis of the relation between an entry speed estimated from the action of the human body or the like and the time required from the detection of the entry by the human body or an obstacle to the cut off of the laser lights or the darkening of the laser lights (namely, when the distance is too short, the danger in which the laser light cutting off or the laser light darkening after the entry detection becomes too late is produced. Consequently, it is necessary to perform the setting of the distance (the interval) suitably).

With regard to the monitoring area 6, for example, the following forms can be cited:

(a) the form of setting the monitoring area 6 in a region of the screen where reflectance is high, and (b) the form of providing a reflection member (a retroreflection sheet or the like) in a region where the reflectance of the periphery of the screen is low.

In the form (a), image projection is performed in the state in which the projection area 3 is positioned in the region of the screen 2 where the reflectance is high. In consideration of the fact that the projection area 3 is normally set to have a region smaller than the maximum size (the size of a white back ground part) of the screen 2 slightly, the position of each of the areas 6A-6D is set on the outer periphery of the projection area 3. That is, in the form (a), the region having high reflectance in the screen 2 can be utilized as it is. On the other hand, the existence of the monitoring area 6 influences the image size of the projection area 3, and the display region becomes slightly narrower.

Accordingly, in the form (b), a retroreflection sheet or the like is pasted on the periphery of the screen (black back ground part or the like), and the part is utilized as the monitoring area. Accordingly, it becomes possible to perform image display on the full screen.

The monitoring area 6 is set to be larger than the projection area 3 in size and position on the basis of a measured value of the distance from the image projection apparatus 1 to the screen 2 and the F value of the projection lens. At this time, the radiation lights having high light intensity is not outrightly applied to the projection area 3, however the radiation lights having the brightness which is sufficiently safe for the eye are first projected on the projection area 3. Then, it is preferable to perform the setting of the size and the position of the monitoring area 6 by observing the angles of view of the radiation lights.

Figure 3:
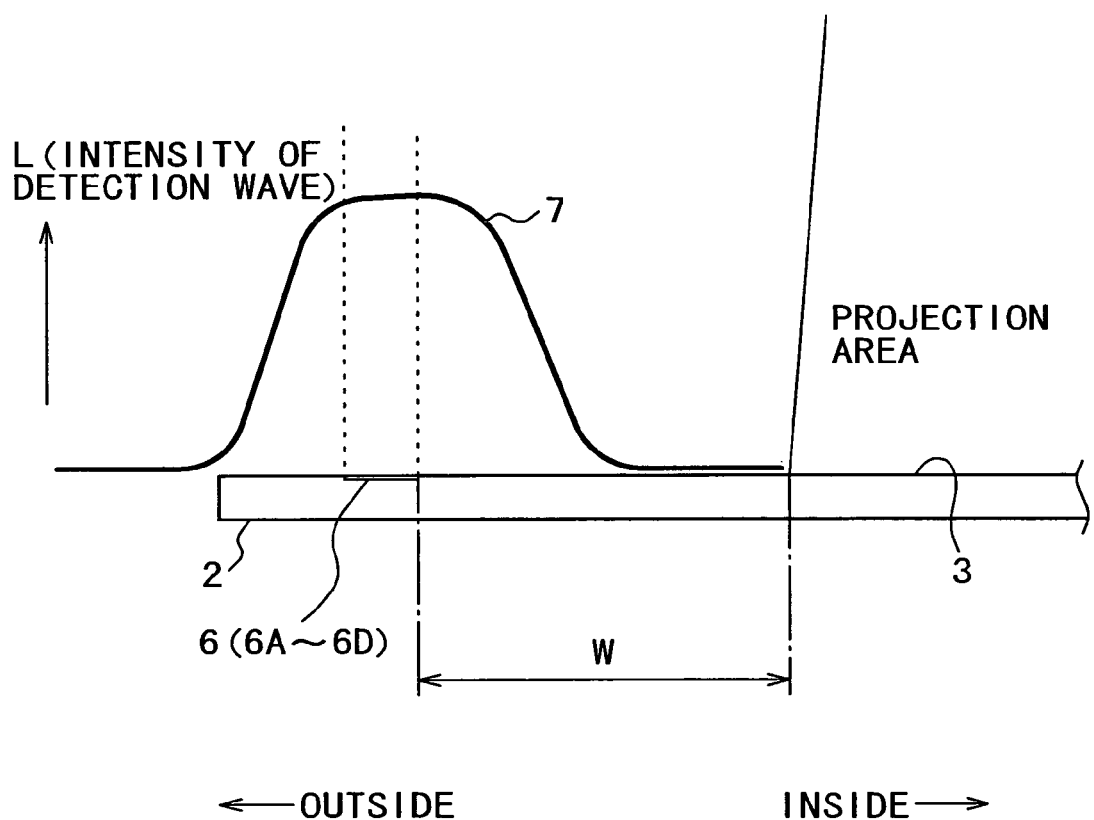
FIG. 3 is a view for illustrating an intensity distribution of a detection wave radiated on the periphery of the screen.

FIG. 3 shows a schematic intensity distribution of the detection wave. With regard to a curved line 7 in the graph indicating the intensity distribution, the intensity of the detection wave is indicated in the direction designated by an arrow L, and positions on the screen 2 are indicated in the direction perpendicular to the direction designated by the arrow L.

The detection wave is radiated toward positions distant from the outline of the projection area 3 to the outside thereof by the interval designated by the letter "W". The detection wave has a distribution in which the detection wave shows an almost constant intensity being a prescribed level or more in a region slightly wider than the width of the monitoring area 6 (the widths of the areas 6A-6D) and the intensity gradually decreases as the position moves from the region to the inside or the outside of the screen 2. That is, when the width of the monitoring area 6 is too large in comparison with the width of the projection area 5, the foot parts of the detection wave, which indicates low intensities, are included in the monitoring area 6. Consequently, the following problems are produced. That is, the intensity becomes unstable, and a signal to noise (S/N) ratio necessary for detection cannot be acquired. Accordingly, it is preferable to set the width of the monitoring area 6 to be within the projection area 5 of the detection wave when the monitoring area 6 is viewed from the direction opposed to the screen 2, and to set the width to be within the region (the flat area) in which the intensity of the detection wave is almost a constant level equal to a prescribed level or more.

Next, a monitoring process will be described.

A principle in the case where each of the areas 6A-6D of the monitoring area 6 is monitored by the reflection wave detection means 1d to perform a judgment process related to entry detection is as follows.

Each configuration area of the monitoring area is monitored as, for example, a detected image by the reflection wave detection means 1d. As an example, it is supposed that the size of a certain monitoring area 6B corresponds to the image size of "2 pixels in width×600 pixels in length=1200 pixel in sum" of the corresponding detected image, and that the intensity of a reflection wave is shown by means of a prescribed gradation expression with regard to each pixel data. That is, the detection wave is irradiated in the projection area 5 on the screen 2, and is reflected by the screen. The intensity of the reflection wave is recognized as the data of each pixel constituting the detected image in the monitoring area. For example, when the intensity of a reflection wave from the screen 2 is detected at a precision of 256 gradations, the judgment of entry detection can be performed by setting a reference region of the intensity of the reflection wave based on the pixel data previously to examine whether the actual intensity of the reflection wave is within the reference region or not. When the reference region is regulated to be, for example, the region of 70-120, and when the actual intensity of a reflection wave is smaller than the reference region (0-69), or when the actual intensity of the reflection wave exceeds the reference region (121-255), it is recognized that the detection wave is interrupt at the pixel indicating the data, or that the detection wave is too bright.

In the case where a reducing of the intensity or a rise of the intensity is perceived by the performance of a judgment of the intensity of the reflection wave being unpermitted based on a comparison result of the intensity of a predetermined number (for example, 6) of pixels or more in the 1200 pixels of the monitoring area with the intensity of the reference region, then it is judged that entry by the human body or an obstacle is made. Incidentally, a change of the detected value of the intensity of the reflection wave based on each pixel data is caused by an interruption of the detection wave by the human body or an obstacle, or by direct reflection of the detection wave by the human body or the obstacle. It is possible to compare a level detected by the reflection wave detection means $1d$ with a prescribed threshold value or the reference region, and to detect entry into the monitoring space surrounded by the detection wave on the basis of the comparison result. Incidentally, the "detection" includes the detection of the size or the moving direction of the human body or an object in addition to, needless to say, their existence itself.

As described above, it is effective not to perform the detection of the whole detected image, however to perform the detection of a part of the detected image corresponding to the monitoring area by level comparison. A complicated image process taking a lot of time is unnecessary.

When entry by a person or the like is detected through such a monitoring system, the safety mechanism works. That is, the reflection wave detection means $1d$ detects a reflection wave from the screen 2 in connection with the monitoring area 6(6A-6D). The reflection wave detection means $1d$ measures the intensity of the reflection wave from the screen 2 on the basis of each pixel data of the monitoring area 6. Then, for example, detects that the intensity of the detection wave reflected by entry into the human body or an obstacle differs from the intensity of the reflection wave from the screen or a reflection member (such as a retroreflection sheet or the like) in the case where no such entry is made. Then, when abnormality including a reducing or a rise of the intensity is detected in any monitoring area, the radiation lights (such as the laser lights or the like) is cut off or darkened. With regard to the mechanism, for example, the following configuration forms can be cited:

a form for interrupting the emission light from the light source $1a$ by a cutting off mechanism such as a mechanical shutter or the like, a form of drive control of optical modulation means, for example, a form of making the drive of an light modulation element an off state (a dark state), a form for stopping the feeding of a power to the light source $1a$, or for reducing the supply power, and a combination of the forms described above.

Figure 4:
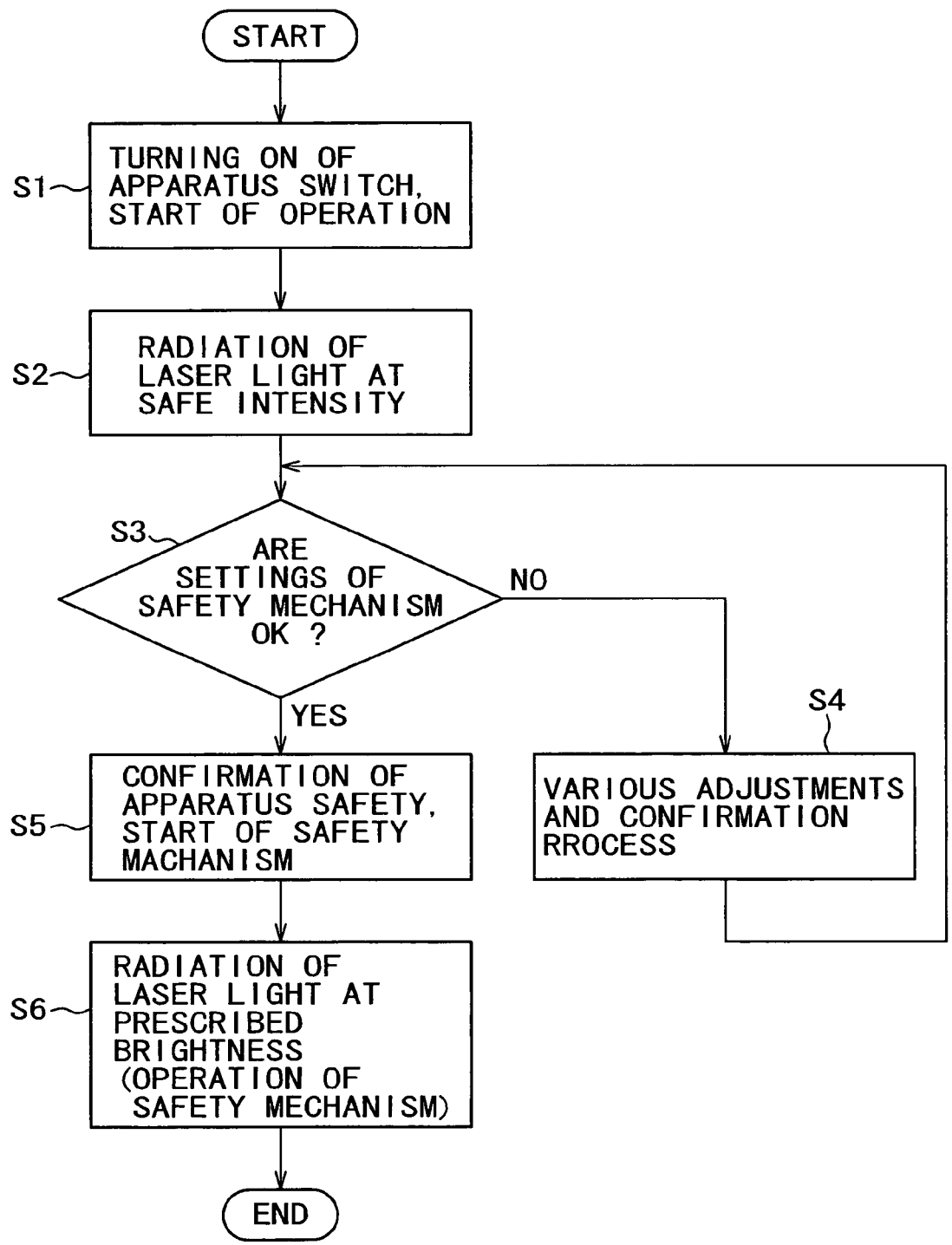
FIG. 4 is a flowchart representation explanating a safety measure in the image projection apparatus.

FIG. 4 is a flowchart representation for illustrating an example of a safety measure pertaining to the image projection apparatus 1. According to the present algorithm, an accident can be prevented from occurring in the case where a person carelessly enters the projection region of the laser lights by performing the projection of a laser light having the sufficiently safe intensity for the eyes of the person until the safety of the projection of the laser lights is confirmed.

The process steps are as follows:

(S1) starting operation by turning on the switch of the apparatus, (S2) irradiating a laser light having the intensity which is sufficiently safe to the eye, (S3) confirming the set eye state of the safety mechanism to advance to (S4) when re-setting is needed or to advance to (S5) when no problem exists in the setting, (S4) after performing various adjustments and confirmation processes, return to (S3), (S5) a user or an administrator of the apparatus confirming the safety to turn on the switch for making the safety mechanism operate, and (S6) irradiating a laser light in prescribed brightness. As described above, when entry by the human body or an obstacle is detected in this state, the laser light is cut off or the intensity of the laser light is reduced by darkening to the safe level similarly to (S2).

Incidentally, the adjustment or the confirmation matters at (S4) are, for example, as follows:

the automatic adjustment and the confirmation of a projection distance, the setting of a monitoring area based on the projection distance and the angle of view, the automatic adjustment of a detection wave output, a radiation position and the like according to the radiation to the screen and the distance of a detection wave, and the confirmation of the intensity of the reflection wave from the screen and the change of setting of the screen in response to the necessity, and the like.

As the present embodiment, the control is preferably performed in order that image projection may be performed with the intensity of an radiation light reduced to a level at which the radiation light is not dangerous to the human body until no detection of the entry into the monitoring space surrounded by the detection wave, especially the entry by the human body, is confirmed, and that the intensity of the radiation light may be raised to a regulated level after the safety has been sufficiently confirmed. Then, after the image projection apparatus 1 confirms that the monitoring space is not entered by the human body or an obstacle, a user (an operator of the apparatus) confirms that the projection area 3 is not entered by the human body or an obstacle to make double sure, and then the projection output of the radiation light is not raised until the user turns on a dedicated switch. Thus, the safety can be further improved.

Incidentally, although (S2)-(S4) mentioned above can be manually or automatically operated, automation is preferable from the point of view of the convenience for a user. Moreover, it is preferable that the preceding adjustment and the setting state are stored in storage means in the apparatus together with the conditions at that time (the projection angle of view, the projection distance and the like), and that the preceding storage information is verified with the information acquired from the present situation at the time of the next apparatus start. For example, the image projection apparatus 1 is constituted as follows. That is, when a verification result is permitted (namely, when the verification result does not differ from the preceding state greatly), the process advances from (S2) to (S5). However, when the situation has changed from the verification result greatly, the adjustments and the settings are performed over again from the beginning.

Next, an example of a projector apparatus having the function of entry detection and danger prevention will be described by reference to FIGS. 5-20. Incidentally, it is possible to apply the example to the form for detecting the entry into the passage area of projection light (a laser light) by a person to prevent the entering of the light to the eyes of the person, and to the form for decreasing the intensity of the light to an undangerous degree.

Figure 5:
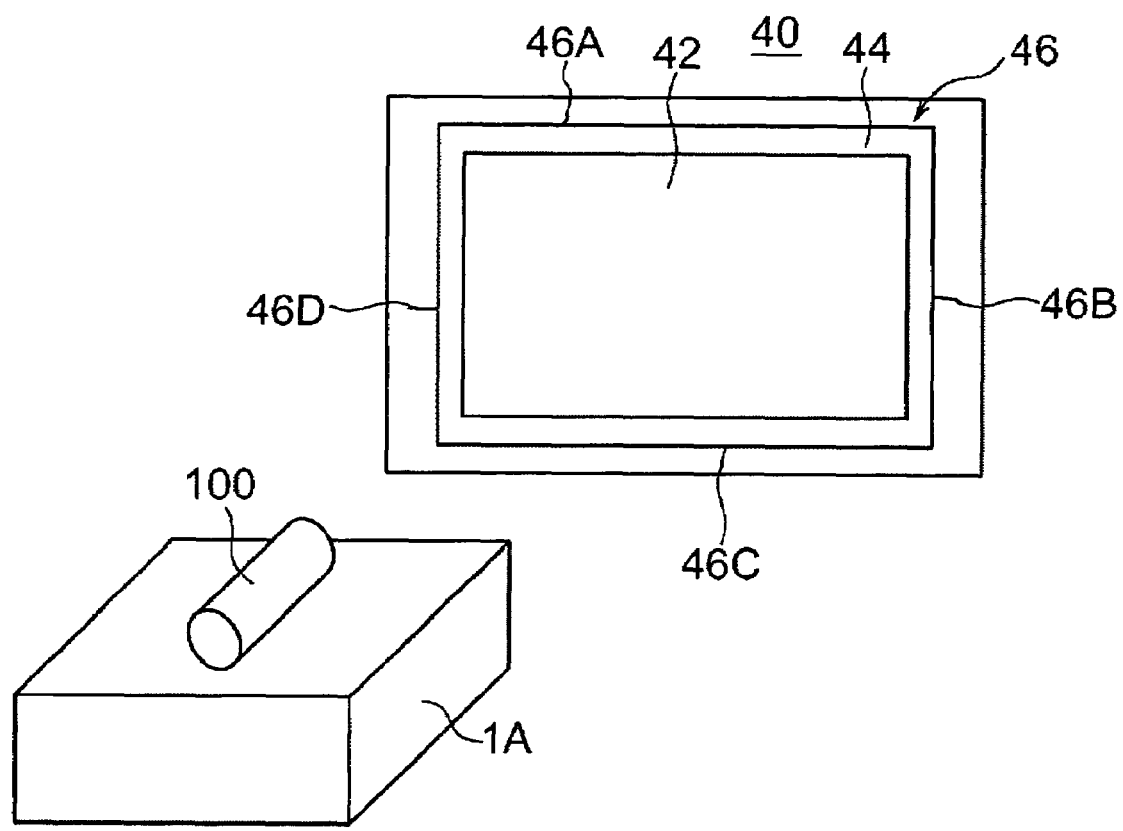
FIG. 5 is a view for explanating a configuration example of an image projection apparatus, and showing a view of an arrangement example of a projector apparatus and a screen unit.

FIG. 5 is a perspective view showing a projector apparatus main body unit and a screen. The project or apparatus includes an apparatus main body unit 1A and image means 100 such as a CCD type image sensor (corresponding to the reflection wave detection means 1d) which is mounted on the apparatus main body unit 1A.

Then, a screen 40 is arranged in front of the projector apparatus. An image projection area 42 is regulated on the surface of the screen 40. A rectangular monitoring area 46 is regulated on the peripheral area 44 of the image projection area 42. Incidentally, in the present embodiment, the monitoring area 46 is composed of monitoring areas 46A-46D corresponding to each side of a quadrilateral severally.

Figure 6:
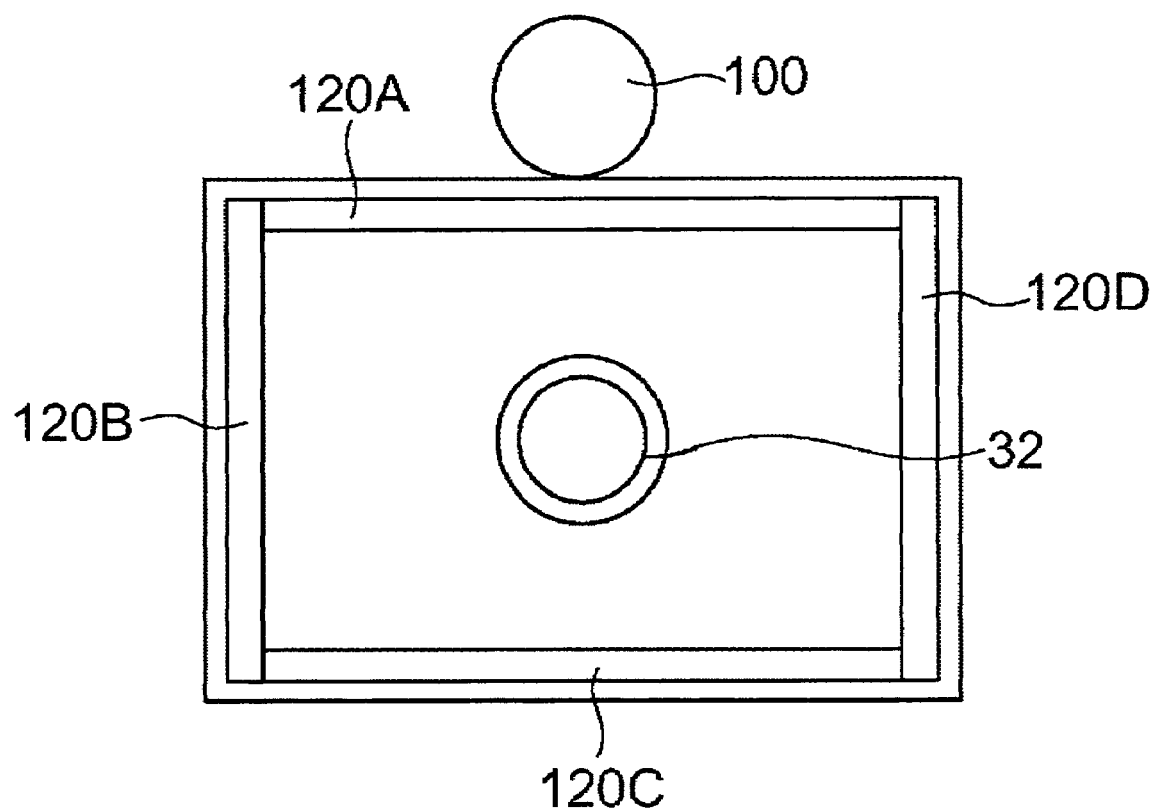
FIG. 6 is a front view of the projector apparatus shown in FIG. 5.

FIG. 6 is a front view of the apparatus main body unit 1A. FIG. 6 shows a projection lens 32, the image means 100 and infrared ray radiation means 120 (120A-120D).

The projection lens 32 is located in the center of the front surface of the apparatus main body unit 1A. An image is projected from the projection lens 32 to the projection area 42 on the screen 40 (the focal length of the projection lens 32 can be adjusted).

The infrared ray radiation means 120 is located on the periphery of the front surface of the apparatus main body unit 1A. In the present embodiment, the infrared ray radiation means 120 includes four infrared ray radiation units 120A-120D for irradiating infrared rays. That is, these infrared ray radiation units irradiate infrared rays having a prescribed wavelength (for example, $\lambda$=880 nm) to each of the monitoring areas 46A-46D constituting the monitoring area 46.

Figure 7A:
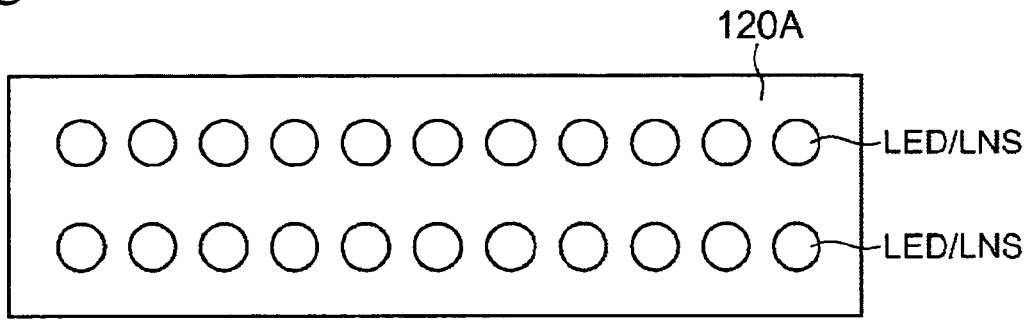
FIGS. 7A, 7B, 7C and 7D are views illustrating an example of infrared ray radiation means.
Figure 7B:
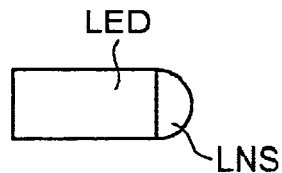
Figure 7C:
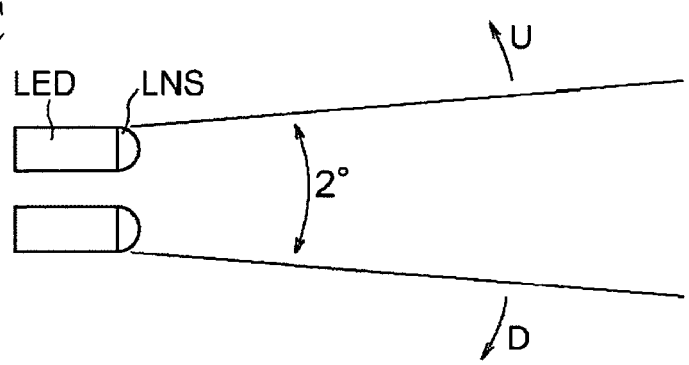
Figure 7D:
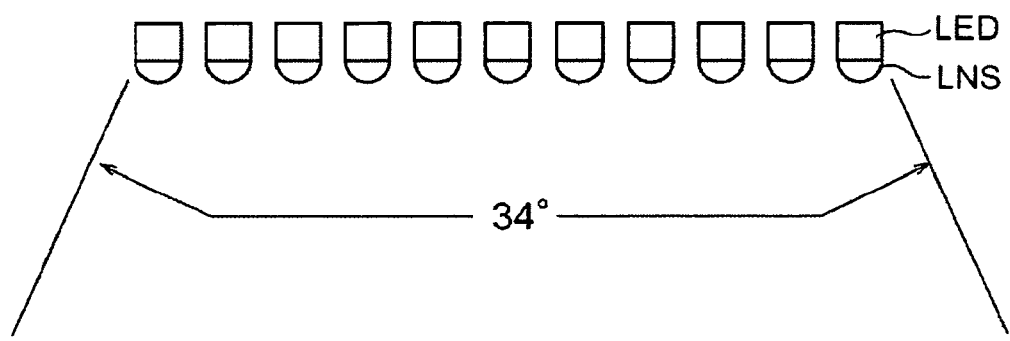

FIGS. 7A-7D exemplify one (120A) of the infrared ray radiation units. FIG. 7A is the front view thereof. FIG. 7B is the side view thereof showing a light-emitting device. FIGS. 7C and 7D are explanatory views of infrared ray radiation angles.

Each of the infrared ray radiation units 120A-120D has the same configuration. As shown in FIG. 7A, arrays of a plurality of light-emitting devices (for example, eleven light-emitting diodes for radiating infrared rays in each array) in the longer direction are arranged in two rows in a direction (the vertical direction in the figure) perpendicular to the longer direction.

As shown in FIG. 7B, each light-emitting diode is provided with a correction lens "LNS" on the front surface of the light-emitting diode. Then, in the present embodiment, as shown in FIG. 7C, a divergence angle (a wave angle) based on the optical axis direction of the correction lens is set to 2° in a vertical plane including the optical axis. Moreover, as shown in FIG. 7D, a divergence angle based on the optical axis direction is set to 34° in a horizontal plane. Each of the infrared ray radiation units irradiates an infrared ray toward the monitoring area (for example, 46A) corresponding to each of the infrared ray radiation units.

Incidentally, the number of the light-emitting devices used in each of the infrared ray radiation units is not necessarily the same to each other. For example, the using device numbers of the infrared ray radiation units 120B and 120D located on the short sides of the quadrilateral may be less than those of the infrared ray radiation unit 120A and 120C located on the long sides of the quadrilateral.

Moreover, each of the infrared ray radiation units is provide with a tilt mechanism for making it possible to adjust a radiation angle toward the screen 40 manually or automatically. That is, because the projection distance from the main body unit 1A to the screen 40 and the positional relation of both of them are not always fixed, it is preferable to constitute the project or apparatus in order to be able to adjust the radiation directions, the radiation regions and the like of the infrared ray radiation units 120A-120D, and to be able to adjust the focal length of the projection lens 32 and the like. The projector apparatus is frequently used in various situations. The various situations can be cited as follows. For example, the case where the projection distance is 3 m, and the projection lens 32 and the projection area 42 of the screen 40 are in a horizontal positional relation; the case where the projection distance is 5 m, and a projection image is irradiated from the projection lens 32 to the projection area 42 upward; and the like can be cited (in addition to the capability of the adjustment of the direction and the focal length of the projection lens 32, it is preferable that the tilt (the inclination operation) of the infrared ray radiation units 120A-120D is made possible and the tilt angle of each of the infrared ray radiation units is made to be adjusted according to the zooming of the projection lens 32 and the like).

For example, it is possible to adjust the infrared ray radiation units 120A-120D manually or automatically as shown by an upward arrow "U" or a downward arrow "D" in FIG. 7C according to the projection distance.

Figure 8A:
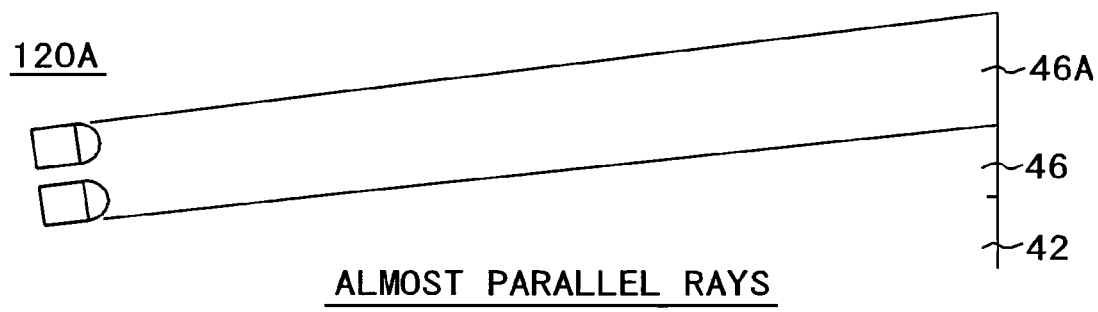
FIGS. 8A and 8B are views showing a radiation example of the infrared ray radiation means.
Figure 8B:
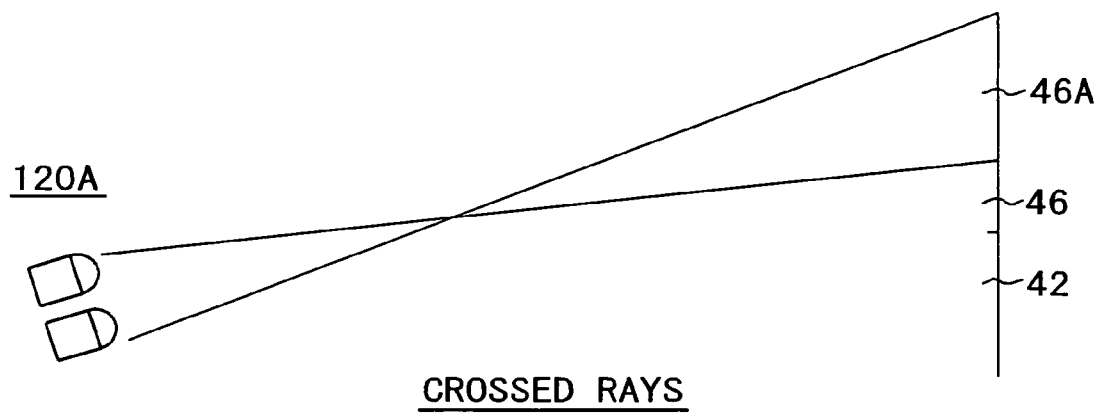

FIGS. 8A and 8B are views for illustrating a radiation direction and a radiation width of the infrared ray radiation units. FIGS. 8A and 8B exemplify the infrared ray radiation unit 120A, and shows the states when the infrared ray radiation unit 120A is viewed from the side direction perpendicular to the vertical plane.

It is possible to perform the adjustment or the setting of the divergence angle and the infrared ray radiation width in the vertical direction and in the horizontal direction according to the distance between the main body unit 1A and the screen 40. For example, an optical path setting for making rays (infrared rays) from the infrared ray radiation unit 120A to be almost parallel rays to irradiate the monitoring area 46A as shown in FIG. 8A, an optical path setting for making radiation rays from the infrared ray radiation unit 120A approach to cross with each other and advance to be away from each other as shown in FIG. 8B, and the like can be cited.

The intensity distribution of the infrared rays to be radiated to the peripheral area 44 of the screen by each of the infrared ray radiation units is as illustrated in FIG. 3. That is, the curved line 7 in the graph of FIG. 3 indicates the intensity of the infrared rays, and the monitoring area 46 is located in a region on the screen 40 corresponding to the region of the peak of the intensity (the flat part). For example, the value of the distance "W" is 10 cm, and the width of each of the monitoring areas 46A-46D is supposed to be all the same, or it is also possible to change the widths individually as the occasion demands.

The image means 100 images the screen 40 including the monitoring area 46. A filter transmitting only an infrared component at the normal operation of the projector apparatus is formed on the front surface of the image means 100. The image means 100 detects the infrared rays reflected from a region including the monitoring area 46 (incidentally, it is needed to remove the filter at an adjustment step which will be described later).

A signal process of an infrared ray image detected through the image means 100 (a detected image by the infrared rays which have passed through the filter) is performed by an entry detection and danger prevention control unit 110 which will be described later.

FIG. 9 is a block diagram showing a configuration example of the projection system. The projection system includes an optical modulation unit 10, an optical adjustment unit 20, an optical projection unit 30, the screen 40, a power source system 50, a signal process unit 60, the image means 100, the entry detection and danger prevention control unit 110, the infrared ray radiation means 120 and a feeder apparatus 130.

The feeder apparatus 130 feeds electric power to the infrared ray radiation units 120A-120D. By receiving a command from the entry detection and danger prevention control unit 110, the feeder apparatus 130 can change the electric power to be supplied to each of the infrared ray radiation units. Accordingly, it is possible to perform the adjustment and the setting of the output level of the light-emitting device group constituting each of the infrared ray radiation units. Incidentally, the entry detection and danger prevention control unit 110 constitutes the entry detection means. The entry detection and danger prevention control unit 110 is composed of, for example, a computer (including a memory, a display device and the like), a dedicated circuit and the like.

The optical modulation unit 10 includes a light source unit 12, an illumination light generation unit 14 and a space modulation light generation unit 16.

The light source unit 12 includes a green laser diode LD(G), a blue laser diode LD(B) and a red laser diode LD(R) Each laser diode is fed from a power source apparatus 52 of the power source system 50 to emit each color laser light.

Incidentally, the power source system 50 includes a power source apparatus 52, which outputs a voltage and a current for driving the lasers to the light source unit 12, and a regulator 54. The power source system 50 is constituted so as to be able to adjust the output level of the power source apparatus 52 by means of the regulator 54 (in the output adjustment, a current or the like output from the power source apparatus 52 to the light source unit 12 can be arbitrarily adjusted over a region of from zero to the maximum permitted value according to a command from the entry detection and danger prevention control unit 110).

The illumination light generation unit 14 is provided for accepting the laser light of each of the colors R, G and B emitted from the light source unit 12 to generate parallel illumination lights. The illumination light generation unit 14 includes a green illumination optical unit LG(G), a blue illumination optical unit LG (B) and a red illumination optical unit LG(R).

The space modulation light generation unit 16 includes optical modulation means. In the present embodiment, a one-dimensional optical modulator called as a grating light valve (GLV) is used. The element is constituted by using a phase diffraction grating capable of electrical on-off control of light (the element is used for digital image display).

For each color light from the illumination light generation unit 14, a GLV (G) for green, a GLV (B) for blue and a GLV (R) for red are severally provided. The space modulation light generation unit 16 further includes a combiner "MX". A drive signal for modulation according to an image signal (VIDEO) to be processed by the signal process unit 60 is severally supplied to each color GLV from a driver circuit 64. The light from the illumination light generation unit 14 is modulated according to the image signal VIDEO to be output.

The combiner "MX" is means for synthesizing the light from each color GLV (image synthesis means). The output light of the combiner "MX" is emitted to the optical adjustment unit 20 at the subsequent stage.

The optical adjustment unit 20 includes an Offner relay optical system 22 and a diffuser optical system 24. The optical adjustment unit adjusts image light from the space modulation light generation unit 16.

The optical projection unit 30 located at the subsequent stage of the optical adjustment unit 20 includes the projection lens 32 and a scanner 34. The optical projection unit 30 constitutes light projection means of an image on the screen. The screen 40 for projection is arranged in front of the optical projection unit 30. An image corresponding to the image signal VIDEO is projected on the screen 40 by the scanner 34, which is equipped with deflection means such as a galvanometer mirror or the like. Incidentally, in the present embodiment, the form in which the scanner 34 is arranged at the subsequent stage of the projection lens 32 is shown. However, the optical projection unit 30 maybe implemented in various configurations such as the form in which the positional relation between the both of the scanner 34 and the projection lens 32 is reversed (the form of performing expansion projection after scanning), and the like.

The signal process unit 60 includes an image signal process unit 62, the driver circuit 64, an overall control unit 66 and a scanner control unit 68.

The image signal VIDEO from image source equipment (such as a computer, a recording and reproducing apparatus, or the like), which is not shown, is input into the image signal process unit 62. A signal process for generating a signal for modulating illumination light (laser lights) by controlling each GLV of the space modulation light generation unit 16 of the driver circuit 64 is performed. Then, the driver circuit 64 receives an output signal from the image signal process unit 62, and then a drive signal to each color GLV to drive each element.

The scanner control unit 68 is provided for performing the rotation control of the scanner 34, and is controlled by the overall control unit 66. Incidentally, the overall control unit 66, for example, transmits a command to the scanner control unit 68 in response to a signal from the driver circuit 64, and controls the whole image signal process, and further performs projection control and the like.

Figure 10:
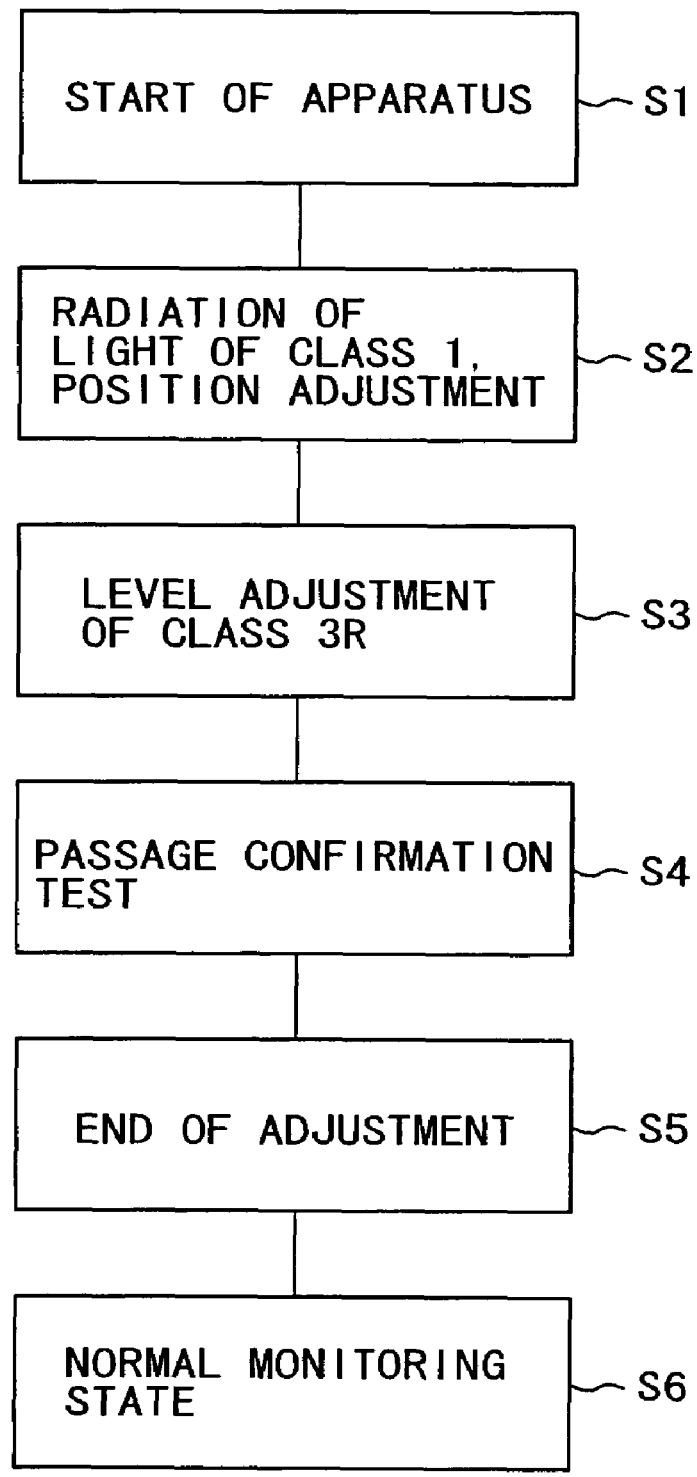
FIG. 10 is a flowchart representation showing a process example of an entry detection and danger prevention control unit.

FIG. 10 is a flowchart representation showing an example of the processes in the entry detection and danger prevention control unit 110. Process steps S1-S6 are as follows:

(S1) a start of the apparatus, (S2) radiation of light of class 1, and a position adjustment, (S3) a level adjustment of class 3R, (S4) a passage confirmation test, (S5) an end of the adjustment, and (S6) a setting of a normal monitoring state.

Incidentally, (S1)-(S5) concern an initial adjustment. (S6) is set when the apparatus is started to be used after the initial adjustment. Moreover, both of (S2) and (S3) are steps pertaining to a radiation adjustment of a laser light. The laser light is made to be reduced to the sufficiently safe intensity for the eye in case of the radiation level of the "class 1" at (S2). Moreover, the radiation level of the "class 3R" at (S3)

is the intensity to be used in a normal operation of a projector apparatus (see "JIS C 6802" as to laser safety regulations).

Figure 11:
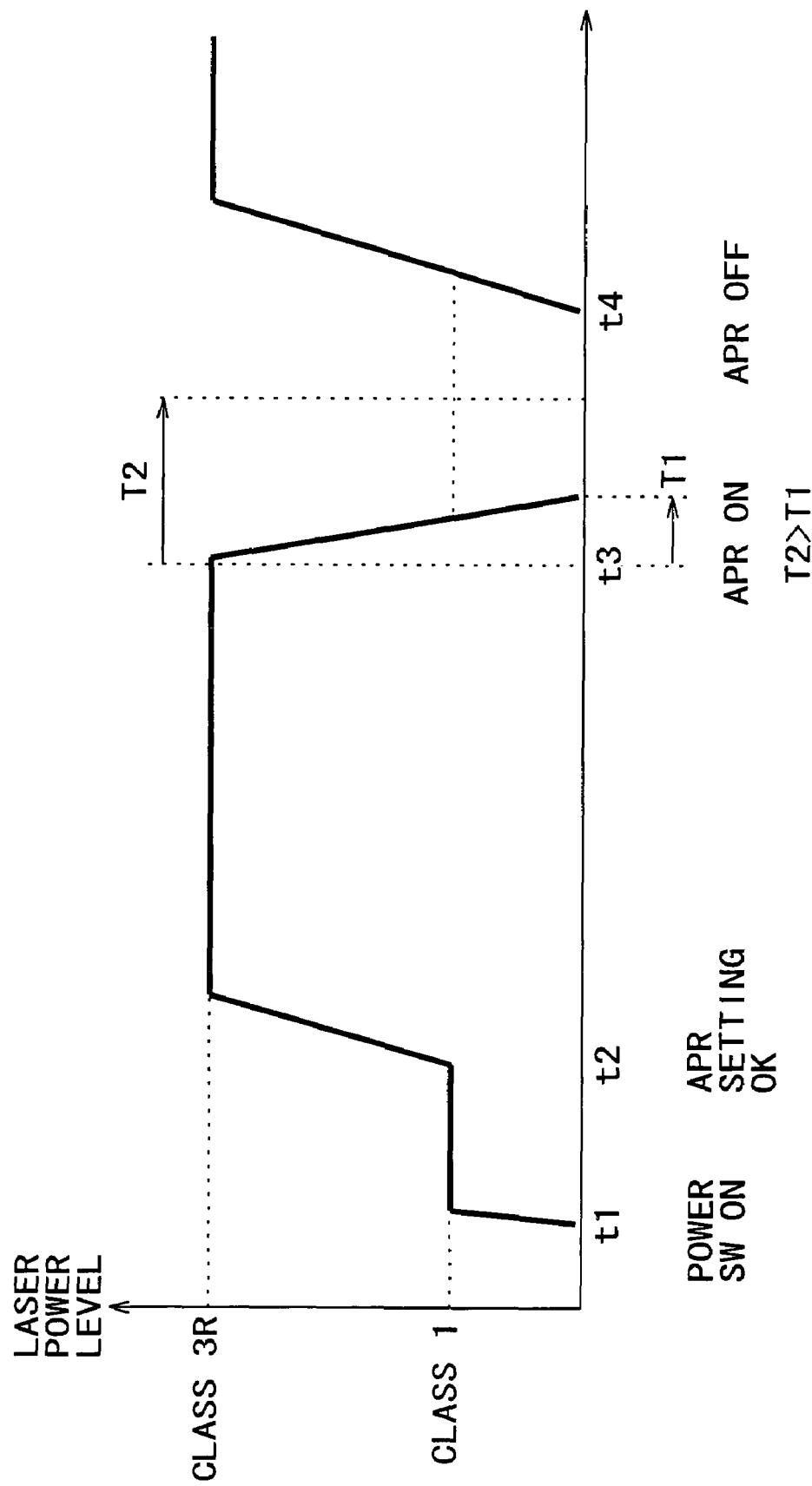
FIG. 11 is a graphical representation showing an example of time progress of a laser light power level.

Next, FIG. 11 is used for describing S1-S6 mentioned above. Incidentally, the abscissa axis of FIG. 11 indicates time, and the ordinate axis indicates the radiation level of a laser light to exemplify the details of the changes thereof in point of time. The meanings of each of the time t1-t4 and periods of time T1 and T2 are as follows:

"t1"=a point of time when the power supply switch of the apparatus is turned on, "t2"=a point of time when a rise from the class 1 to the class 3R is started, "t3"=a point of time when the human body or an obstacle start to enter the monitoring space, "t4"=a point of time when a rise to the class 3R is started, "T1"=a period of time of the operation of APR, and "T2"=a period of time of the entry into the monitoring space by the human body or the obstacle (T2>T1).

In FIG. 11, the "APR" (Auto Power Reduction) indicates a safety mechanism for decreasing the laser power level when the entry by the human body or the like is detected. "ON" indicates an operation state of the mechanism, and "OFF" indicates a release of the cutting off of the laser light after the operation of the mechanism.

First, at the step S1, an operator operates a power supply switch 140 (see FIG. 9) of the projector apparatus to turn on the switch 140 at the point of time t1, and a start of the projector apparatus is instructed. Accordingly, feeding power to each unit of the projector apparatus is performed. Incidentally, in the state in which the image signal VIDEO is not supplied to the image signal process unit 62, only lighting without any image is performed (incidentally, it should be noted that the light from the projection lens 32 does not always correctly project the projection area 42 in this state).

At the next step S2, the radiation level (power) of the laser light rises to the class 1. That is, at the point of time t1, when a signal indicating that the power supply switch 140 is on is input into the entry detection and danger prevention control unit 110, power control to the light source unit 12 is performed, and a laser light having the power of the class 1 is radiated. Then, a position adjustment on the screen is performed.

In the state immediately after the apparatus main body unit 1A of the projector apparatus and the screen 40 have been set, the infrared rays radiated from the infrared ray radiation units 120A-120D toward the monitoring areas 46A-46D do not always correctly irradiate expected positions.

Accordingly, in addition to the adjustment of the directivity or the projection distance of each of the infrared ray radiation units, the focal length adjustment of the projection lens 32 and the like are performed by means or automatically as the occasion demands. For example, the direction of the apparatus main body unit 1A, the focal length of the projection lens 32, or the like is adjusted in order that the light from the projection lens 32 may be radiated in a region corresponding to the projection area 42 on the screen 40. Then, after the position of the projection area 42 on the screen 40 has been settled, the positions of both of the radiation region on the screen from each of the infrared ray radiation units 120A-120D and each of the monitoring areas 46A-46D are adjusted so as to be in respectively corresponding positional relations.

Incidentally, with regard to the adjustments of the projection distance, the display position, an image size and the like, the alignment of the infrared ray radiation region and the monitoring areas, and the like, the image means 100 is used for imaging the projection light from the projection lens 32 to the screen 40 and the projection light of the light-emitting diodes constituting each of the infrared ray radiation units as the reflection light of them. Then, the image means 100 inputs the image signals to the entry detection and danger prevention control unit 110. Accordingly, the entry detection and danger prevention control unit 110 performs the signal process of the image signals to make it possible to confirm the adjustments and the alignment on the image display (in case of the adjustment of the projection area 42 and the like, the infrared ray transmission filter (a visible light cutting filter) provided on the image means 100 is removed).

Moreover, it is necessary to secure the sufficient safety of infrared emission power.

Figure 12:
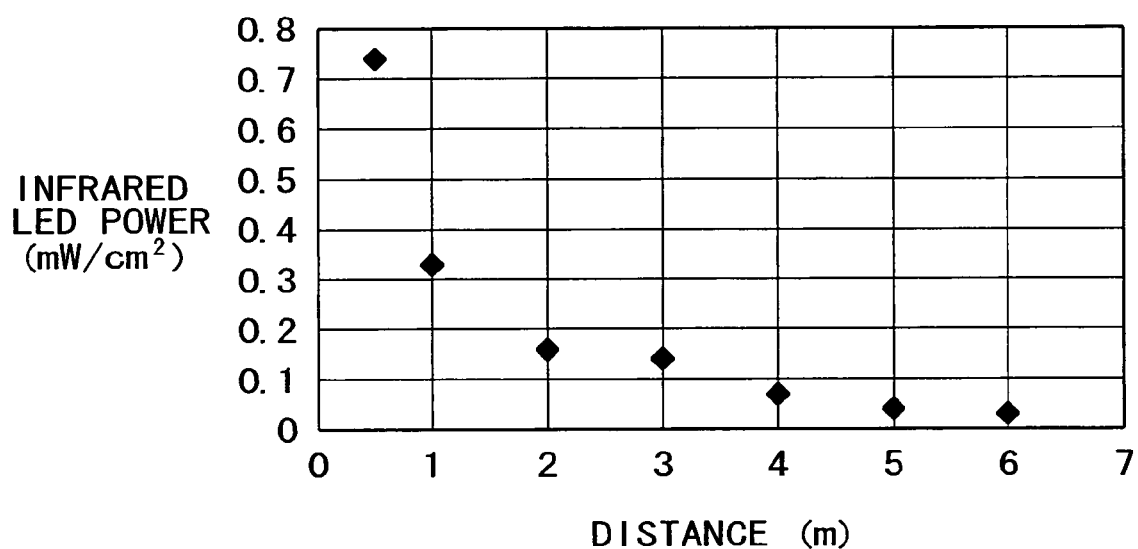
FIG. 12 is a graphical representation exemplifying a relation between an infrared ray intensity and a distance.

FIG. 12 is a graphical representation exemplifying a relation between infrared LED power and a distance.

The maximum permissible exposure (MPE) of a cornea to direct eye exposure regulated in "JIS C6802" is 0.733 mW/cm$^2$ in the case where a wavelength $\lambda$ is 880 nm and a radiation time t is $3\times10^{-4}$ seconds (0.3 ms). The present embodiment is also designed to meet the standard. For example, when a screen size is 80 inches and a projection distance is 2.35 m, the power of the infrared rays in the monitoring area 46 is about 0.15 mW/cm$^2$, and the infrared ray radiation width in the monitoring area 46 is 5 cm. As another example, when the screen size is 180 inches and the projection distance is 6.53 m, the power of the infrared ray in the monitoring area 46 is about 0.054 mW/cm$^2$, and the infrared ray radiation width in the monitoring area 46 is 5 cm.

Figure 13A:
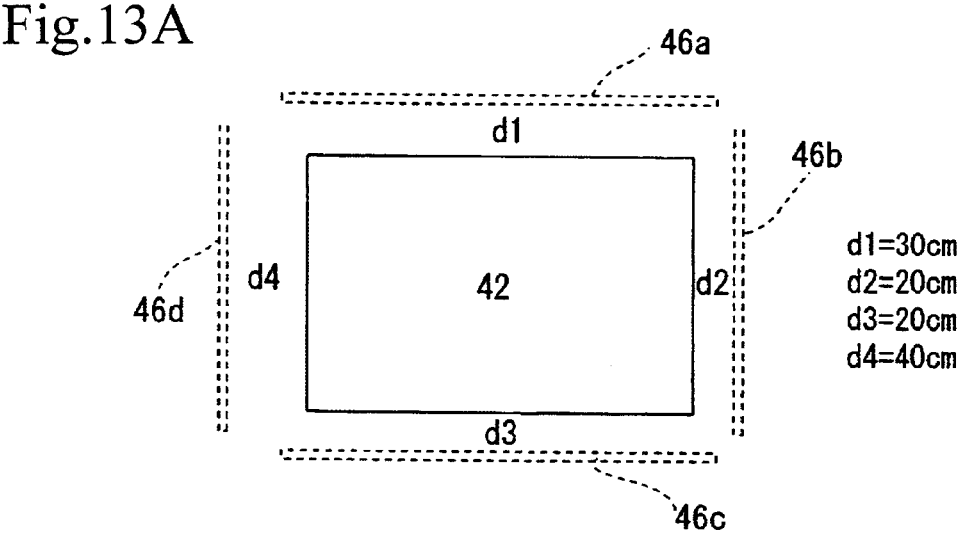
FIGS. 13A, 13B and 13C are views for illustrating a setting method of projection regions of detection waves and monitoring areas.
Figure 13B:
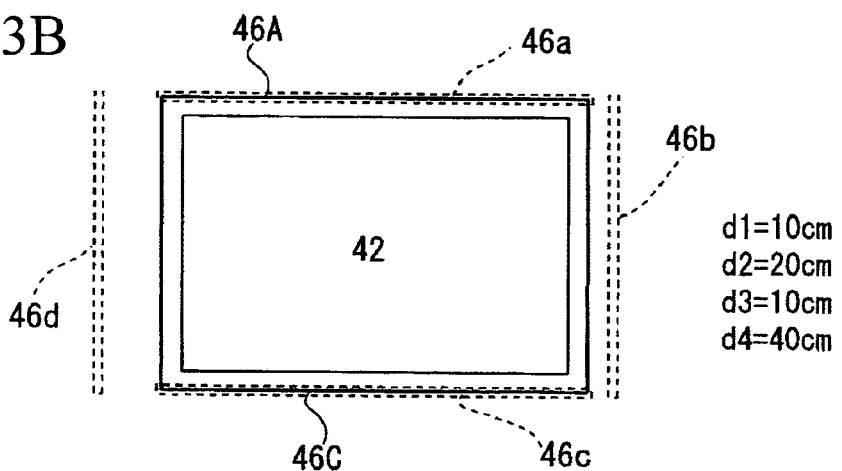
Figure 13C:
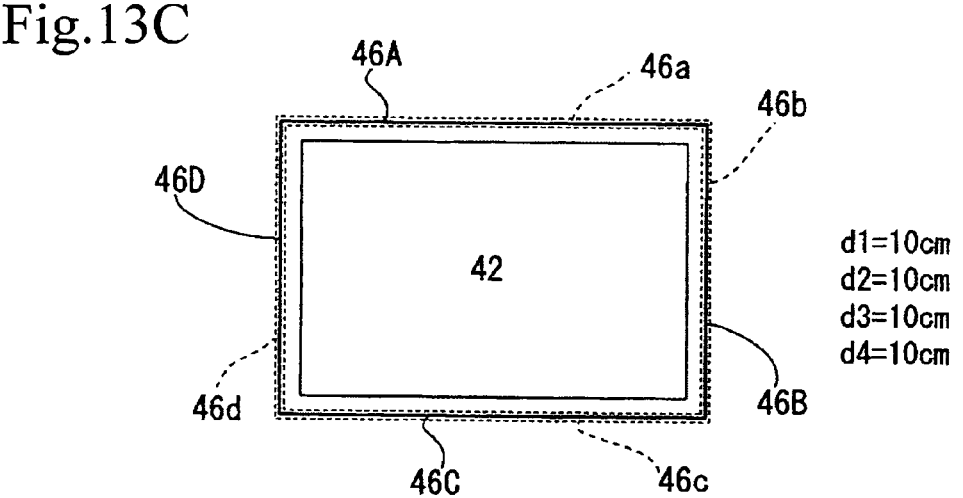

FIGS. 13A-13C are views for illustrating adjustments and confirmation processes of positional relations between each of the projection areas irradiated by the infrared ray radiation units 120A-120D and the monitoring areas 46A-46D. The present embodiment exemplifies the case where, after finishing the position adjustment to the projection area 42 projected from the projection lens 32, an imaging result of the image means 100 stored in the memory of the entry detection and danger prevention control unit 110 is displayed on a display device, which is not shown, to confirm the radiation state from the infrared ray radiation units 120A-120D to the monitoring areas 46A-46D.

FIG. 13A shows the initial state immediately after the projection area 42 has been set. Around the projection area 42, numerical values of the distances of projection regions 46a-46d (indicated by broken lines) of the infrared ray radiation units 120A-120D in the state of being distant from the outer edge of the projection area 42 severally by a distance d1=30 cm, a distance d2=20 cm, a distance d3=20 cm, and a distance d4=40 cm.

The image means 100 images the reflection of the light of the infrared ray radiation units 120A-120D irradiated on the screen 40 through an infrared transmission filter. For example, the monitoring area widths are set to be 5 cm, and the width directions severally correspond to the data for 6 pixels. The length of each of the areas 46A and 46C in the longer direction of the shown monitoring area 46 corresponds to the data for 200 pixels, and the lengths of the areas 46B and 46D correspond to the data for 114 pixels. Then, each pixel data is expressed as, for example, data having 256 gradations.

The entry detection and danger prevention control unit 110 performs the signal process of the image data input from the image means 100. The entry detection and danger prevention control unit 110 binarizes the pixel data related to the projection regions 46a-46d by the use of a threshold value of, for example, 50 to distinguish the pixel data of 50 or more as a logical value "1" from the pixel data less than 50 as a logical value "0". Accordingly, the entry detection and danger prevention control unit 110 displays the part of the projection area 42 and the projection regions 46a-46d on a display screen. At that time, the entry detection and danger prevention control unit 110 calculates the intervals between the projection area 42 and the projection parts 46a-46d to display the calculated intervals as the distances d1-d4.

In the present embodiment, the W value is set to be 10 cm. Consequently, the tilt angles of the infrared ray radiation units 120A-120D are adjusted in order that all of the distances d1-d4 may be about 10 cm.

FIG. 13B shows that the distances d1 and d3 are adjusted in the state in which the light from the infrared ray radiation units 120A and 120C is projected in the areas 46A and 46C distant from the upper and the lower peripheries of the projection area 42 by 10 cm, respectively. Moreover, FIG. 13C shows that the distances d2 and d4 are adjusted in the state in which the light from the infrared ray radiation units 120B and 120D is projected in the areas 46B and 46D distant from the left and the right peripheries of the projection area 42 by 10 cm, respectively.

Incidentally, the vale of W=10 cm is an example. It is needless to say that it is necessary to perform the position settings of the projection regions of infrared light or infrared rays and monitoring areas suitably according to the changes of the angle of view owing to zooming or the like.

When the position adjustment has been performed manually or automatically in the state of FIG. 13C and successively the confirmation thereof has been ended, the process advances to the next step S3 of the adjustment process of the laser power at the class 3R. Incidentally, in this case, the infrared ray transmission filter is attached to the image means 100.

By increasing the supply power from the power source apparatus 52 to the light source unit 12, the laser power which has been at the class 1 at the point of time t2 rises to the class 3R. Incidentally, it is needed to set the APR operate at the time t2 for making the function of the safety mechanism effective.

The reflection light (infrared ray) of each of the monitoring areas 46A-46D is received by the image means 100. The entry detection and danger prevention control unit 110 acquires the detected level of the reflection light, which is imaged by the image means 100 from the pixel data to compare the acquired level with the reference region for examining whether the acquired level is within a permitted region or not. For example, when each pixel data is set to be expressed at 256 gradations, the data is binarized by comparing with the threshold value. The pixel is distinguished by setting that the data equal to the threshold value or more corresponds to the logical value "1", and that the pixel data less than the threshold value corresponds to the logical value "0". Accordingly, it is needed to confirm whether the monitoring areas 46A-46D are correctly irradiated by the infrared rays.

Incidentally, according to experiments, the detected levels of the image sensor (the CCD type image sensor) to various reflection surfaces were the values shown in the following table 1. It is preferable to determine the threshold value according to the quality of the material used for the screen 40. For example, when the quality of the material of the screen 40 is white mat screen, white paper or the like, the setting of the threshold value to be about 55 would make it possible to discriminate a Japanese skin, one of entry detection objects.

TABLE 1

| REFLECTION SURFACE | DETECTION LEVEL OF CCD SENSOR |
| --- | --- |
| Black Almite | 255 |
| White Mat Screen | 73 |
| White Paper | 79 |
| Gray Cloth | 64 |
| Corrugated Fiberboard | 60 |
| Japanese Skin | 38 |
| Glossy Black Cloth | 28 |

At the next step S4, a passage confirmation test of an obstacle to the passage regions (truncated pyramid-like detection regions) of the infrared rays projected from the infrared ray radiation units 120A-120D toward each of the monitoring areas 46A-46D, respectively, is performed. That is, an operator performs the test by putting in and out the obstacle in the detection regions surrounded by the infrared rays to confirm whether a reducing or a rise of a detected signal level is detected or not on the basis of the image data pertaining to the monitoring areas 46A-46D image means 100.

At the time t3 of FIG. 11, a situation in which entry by an obstacle into the monitoring space surrounded by the infrared rays has been started is shown. When this is detected, the APR operates to reduce the laser power abruptly. Then, the laser power becomes zero within the period of time T1 (<T2) conclusive. That is, the laser power is reduced to the level equal to the class 1 or less during the period of time shorter than the entry period of time T2 necessary for the obstacle to enter the projection region of the laser light.

Various forms can be cited as the test method. For example, by putting in and out an object such as a human finger, a glossy black scale or the like into each of the monitoring areas from the outside of the detection region, the lowering and the like of the detected signal level is checked.

The entry detection and danger prevention control unit 110 performs the control for making an alarm sound (an output signal is transmitted to a alarm apparatus, which is not shown) when the obstacle enters the detection region in the passage test. Accordingly, the operator can confirm with his or her hearing sense that the detection of the obstacle has been normally performed. Moreover, the entry detection and danger prevention control unit 110 can also make a not shown display device display the part corresponding to the obstacle in red or the like distinguishingly as the occasion demands (in the monitoring area in which no obstacle is detected, the detected image is displayed in, for example, white). Then, the entry detection and danger prevention control unit 110 can also store the data at this time in the memory.

Such a test is performed to the monitoring areas 46A-46D (incidentally, when it is previously apparent that no necessity of supposition of the entry or the passage of an obstacle exists, the corresponding monitoring area is naturally removed from the test objects).

Incidentally, because the projection from the projection lens 32 to the projection area 42 is unnecessary during the period of the test, it is preferable that the entry detection and danger prevention control unit 110 drives the regulator 54 to reduce the electric power to be fed from the power source apparatus 52 to the light source unit 12 to a very low level, or to stop the feeding from the power source apparatus 52 to the light source unit 12.

When the passage test is completed, the process advances to the next step S5 for ending the series of adjustment operations mentioned above. Incidentally, the order, the number of the performance, and the like of S2-S4 maybe suitably changed.

When the adjustments and the confirmations have ended, the operator operates operation input means (an operational switch or the like), which is not shown, to instruct the end of the adjustments and the confirmations to the entry detection and danger prevention control unit 110.

When the feeding from the power source apparatus 52 to the light source unit 12 is stopped or is made to be the state of very less electric power supply during the passage test, no trouble is caused even if the person enters the region connecting the projection lens 32 with the projection area 42. Consequently, when the operator issues the instruction of the adjustment end, the entry detection and danger prevention control unit 110 can stop the feeding from the feeder apparatus 130 to the infrared ray radiation means 120.

On the other hand, for sending out an alarm for a person to enter the detection region, it is also possible that the entry detection and danger prevention control unit 110 can make the alarm to be output always by continuing the feeding from the feeder apparatus 130 to the infrared ray radiation means 120 as long as the power supply switch 140 is in the on state independent of the feeding state from the power source apparatus 52 to the light source unit 12.

At the last step S6, the entry detection and danger prevention control unit 110 sets the apparatus in the normal monitoring state.

For example, when the image signal VIDEO is input into the image signal process unit 62 from not shown image source equipment to start the projection operation of the projector apparatus, the driver circuit 64 outputs a drive signal corresponding to the image signal VIDEO to the space modulation light generation unit 16, and the overall control unit 66 controls the scanner 34 by means of the scanner control unit 68.

The information indicating the start of the normal projection operation is transmitted from the overall control unit 66 to the entry detection and danger prevention control unit 110, and the entry detection and danger prevention control unit 110 always detects whether a person, an obstacle or the like enters the area corresponding to the detection region (hereinafter referred to as an "entry prohibition area") or not.

The detection method is similar to the method described at the step S4. However, it is preferable to take the following means when the entry detection and danger prevention control unit 110 detects a person or the like in the entry prohibition area, for the protection of the person.

Reducing the electric power supplied from the power source apparatus 52 to the light source unit 12 by controlling the regulator 54 so as to reduce the level of the radiation light traveling from the projection lens 32 toward the screen 40 to the level at the degree of causing no troubles in the naked eyes of the person.

According to a situation, cutting off the electric power to be supplied from the power source apparatus 52 to the light source unit 12.

As a result of the means, the radiation light traveling from the projection lens 32 toward the screen 40 becomes dark or nothing. Moreover, at this time, the entry detection and danger prevention control unit 110 can output an alarm sound, an alarm message or the like.

The danger prevention process by the entry detection and danger prevention control unit 110 differs according to the situation when a person enters the entry prohibition area.

For example, when the W value of each of the monitoring areas 46A-46D is set to be 10 cm and an entry speed is 2 m/s (meters every second), the duration of entry by a line-shaped object is 0.05 sec. Moreover, when the entry speed is a half (1 m/s) of the former case, the duration of entry by a line-shaped object is 0.10 sec. If a human being enters into the monitoring areas, the width of the person is wider than the width of the line-shaped object. Consequently, the entry time becomes longer than 0.05-0.1 sec. by several folds to ten-some folds.

Moreover, a person is moving along a surface formed by connecting each of the infrared ray radiation units to each of the monitoring areas (a boundary of the entry prohibition area), the person who enters the monitoring areas is in the state of staying in the entry prohibition area. When the length of each of the monitoring areas in their longer directions is supposed to be 2 m, and when entry speed is supposed to be 2 m/s, the person is staying the entry prohibition area for about one second.

On the other hand, noises are inevitably mixed to the image data imaged by the image means 100. Then, there is the possibility that an erroneous judgment in which a person has instantaneously and partially entered the entry prohibition area is made (it is unnecessary to perform a hypersensitive judgment process in such a case).

Accordingly, it is preferable to perform a phased prevention process according to a multiplication result of an entry continuing time and the size of an entry area.

Hereupon, the "entry continuing time" means a time during which an entry state of the entry prohibition area is continuing. Moreover, the "size of an entry area" means the area of a part of the reflection light level of each of the monitoring area 46A-46D detected by the image means 100 which part deviates from a prescribed reference region (for example, the area corresponds to the number of pixels having the data equal to the threshold value or less) in the case where the part deviates from the region.

The following table 2 exemplifies "entry state indication values", which is defined by a product of a continuing entry time and the size of an entry area (the area of the entry part or the like), and the contents of processes performed by the entry detection and danger prevention control unit 110 according to the products.

TABLE 2

| ENTRY STATE INDICATION VALUE | PROCESS CONTENTS OF ENTRY DETECTION AND DANGER PREVENTION CONTROL UNIT |
|---|---|
| First Judgment Level or Less | Nothing is Performed |
| Second Judgment Level or Less | Reducing the Power of The Light Source Unit 12 to 75% and Outputting a Slight Alarm Sound |
| Third Judgment Level or Less | Reducing the Power of The Light Source Unit 12 to 50% and Outputting a Strong Alarm Sound |
| Fourth Judgment Level or Less | Stopping the Feeding to the Light Source Unit 12 |

In the present embodiment, four steps of processes according to the entry state indication values (reduces of the power of the light source unit and a stop of feeding) are performed. The entry detection and danger prevention control unit 110 changes the electric power level of the power source apparatus 52 through the regulator 54 to adjust the output of the light source unit 12 for preventing bad influences to the eyes of the person who enters the entry prohibition area. Incidentally, the processes of the entry detection and danger prevention control unit 110 according to the entry situations is not limited to the embodiment mentioned above. Various process methods can be performed. For example, a method of judging only by entry continuing times, a method of judging only by the size of an entry area (a planar dimension of the entry), a method of judging by considering further different factors, and the like can be cited.

When a person enters the entry prohibition area, it is possible to prevent any harm to the human body by the process described above. In particular, even when an infant or the like who cannot understand the situation enters the entry prohibition area, a sufficient safety measure can be taken.

Next, variation forms of the configuration will be described.

It is preferable to automate the adjustment of the inclination operation angle (the tilt angle) of each of the infrared ray radiation units 120A-120D constituting the infrared ray radiation means 120. By providing a drive source such as a motor or the like and a tilt mechanism to each of the infrared ray radiation units, radiation direction control can be performed through the attitude control by them.

Moreover, in the embodiment mentioned above, the example of advancing to the normal monitoring process after the end of the adjustments at the step S5 shown in FIG. 10 is described. However, when a projector apparatus to which the adjustment operations have already ended is used, it is also possible to start from the normal monitoring state at the step S6 immediately after the power supply switch 140 has been turned on. In this case, for example, a flag (an adjustment end flag) for indicating the completion of the adjustment operation at the step S5 may be prepared, and the flag may be set to a prescribed value (for example, "1") to be stored in the memory in the entry detection and danger prevention control unit 110.

In the normal monitoring state at the step S6, infrared rays are continuously radiated from each of the infrared ray radiation units 120A-120D to each of the monitoring areas 46A-46D of the screen 40. However, the present invention is not limited to the embodiment. The infrared ray radiation may be performed at a time interval during which it is possible to detect a person of the entry prohibition area (for example, it is possible to perform the infrared ray radiation to the monitoring area 46 at several millisecond interval intermittently).

Moreover, in the embodiment mentioned above, the case where infrared rays are radiated from the infrared ray radiation means 120 to all of the monitoring areas 46A-46D is described. However, for example, when the position of the area 46A is high and there is no possibility of the entry into the area 46A in view of the region of the statures of ordinary persons, it is not necessary to dare to perform the infrared ray radiation of the area.

In the above descriptions, the system in which the monitoring area 46 located on the outside of the projection area 42 on the screen is provided to monitor the entry into the entry prohibition area is supposed. However, it is possible to reinforce the monitoring system by setting another monitoring area on the outside of the monitoring area to be the multi-tiering (double-tiering, triple-tiering or the like) of the monitoring space. In the following, such an embodiment will be described.

FIG. 14 is a block diagram showing a configuration example of the projection system. The basic components are similar to those shown in FIG. 9 (accordingly, the functionally same components are designated by the reference letters which have been already attached, and duplicating descriptions are evaded), and only different points are shown in the following in the state of being itemized.

The monitoring area is made to be double-tiered. A first alarm process unit 70 takes charge of the inside area (a first monitoring space or a first monitoring zone), and a second alarm process unit 80 takes charge of the outside area (a second monitoring space or a second monitoring zone) Entry to each of the monitoring spaces is severally detected, and an alarm process is performed according to the state or the situation of the entry.

The first alarm process unit 70 includes first detection means 72 and first alarm means 74. When entry by the human body or the like is detected by the first detection means 72, the first alarm means 74 outputs an alarm, and changes the intensity of the laser light (reducing or zero).

The second alarm process unit 80 includes second detection means 82 and second alarm means 84. When entry by the human body or the like is detected by the second detection means 82, the second alarm means 84 outputs an alarm.

Figure 15A:
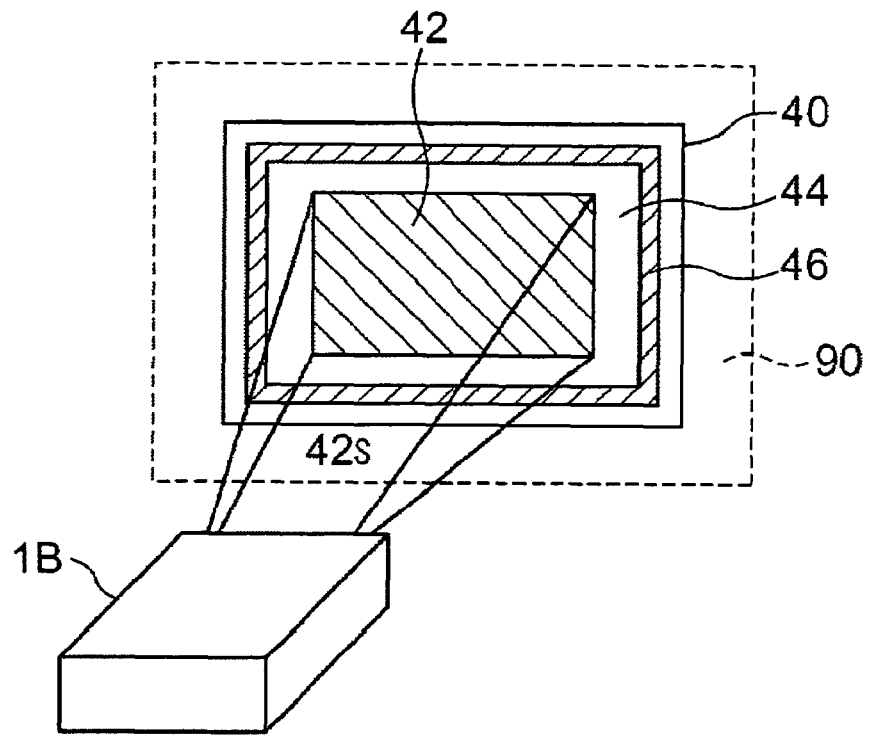
FIGS. 15A and 15B are views showing a positional relation between the projector apparatus and the screen shown in FIG. 14.
Figure 15B:
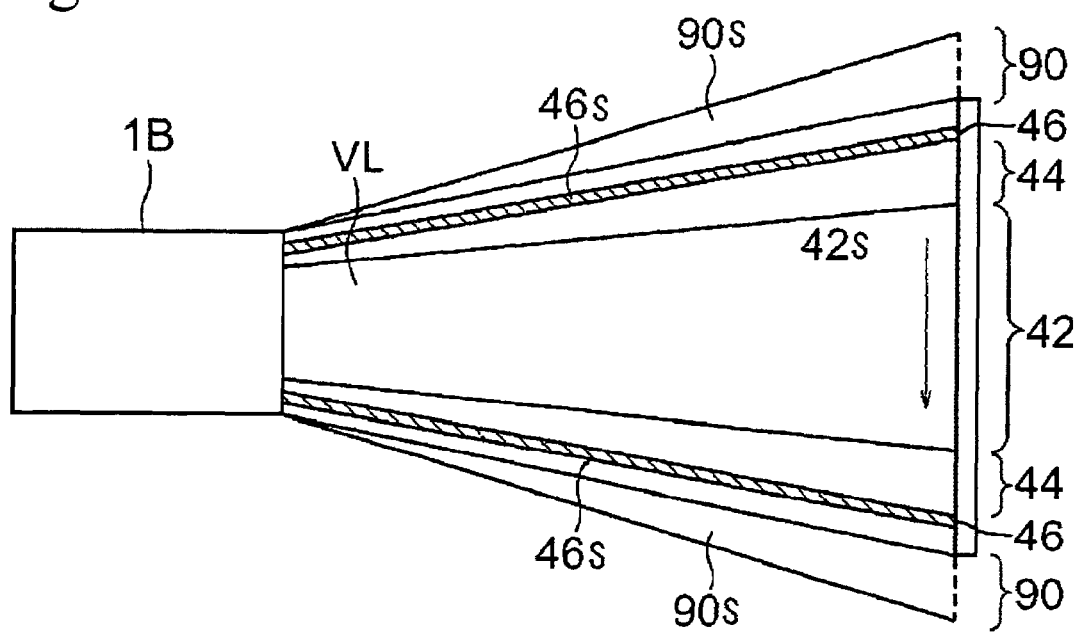

FIGS. 15A and 15B are schematic views showing a positional relation between the main body unit 1B of the projector apparatus and the screen 40. FIG. 15A is a perspective view showing a state of projection light, and FIG. 15B is a sectional view in case of being viewed from the direction (a lateral direction) perpendicular to the projection direction.

An image projected from the optical projection unit 30 of the main body unit 1B to the screen 40 is scanned by the scanner 34 of the optical projection unit 30 to be projected in the projection area 42 of the screen.

A passage area 42S of the light (image light) to be projected from the optical projection unit 30 to the projection area 42 is called as an "image light passing space area".

Moreover, it is supposed that the first monitoring space (or zone) is composed of the following areas.

A "first monitoring area"=a monitoring area located on the outer periphery of the projection area 42 (similar to the monitoring area 46 mentioned above. The width of the first monitoring area is exaggeratingly shown in the drawing).

A "first space monitoring area"=a space area located on the outside (outer periphery) of the image light passing space area 42S (a space area 46S located around the image light output from the optical projection unit 30).

Similarly, the second monitoring space (or zone) is assumed to be composed of the following areas.

A "second monitoring area"=an external area 90 including the outer periphery of the first monitoring area 46 or the first monitoring area 46 (an area shown by a broken line in FIG. 15A).

A "second space monitoring area"=a space area 90S including the outer periphery of the first space monitoring area 46S or the first space monitoring area 46S (see FIG. 15B).

In the first alarm process unit 70 (see FIG. 14), the first detection means 72 detects entry into the first space monitoring area 46S by the human body or an object, or detects the continuous existence of them. Then, the first alarm means 74 outputs an alarm on the basis of detection information from the first detection means 72, and controls the electric power supply to the light source unit 12.

Moreover, in the second alarm process unit 80, the second detection means 82 detects entry into the second space monitoring area 90S by the human body or an object, or detects the continuous existence of them. Then, the second alarm means 84 outputs an alarm on the basis of detection information from the second detection means 82.

Figure 16:
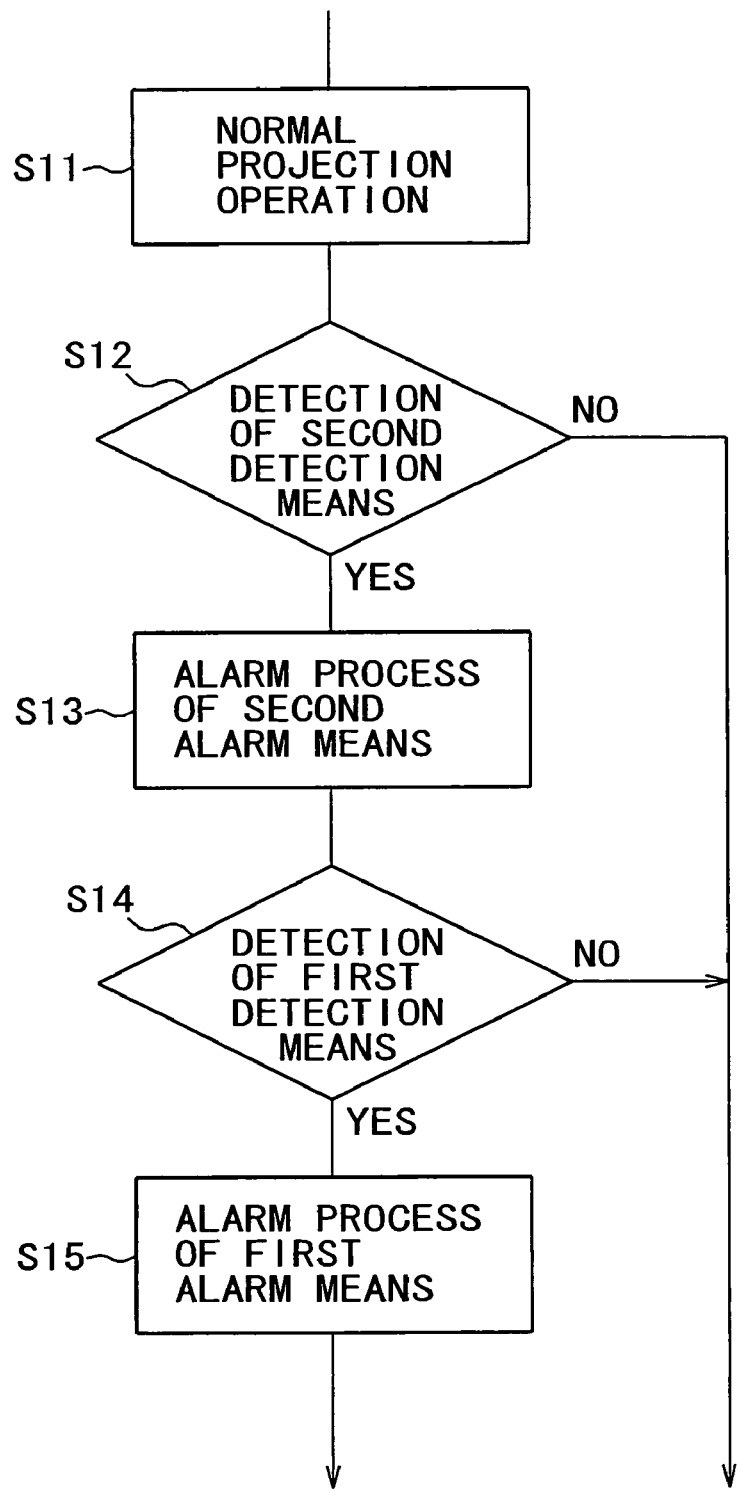
FIG. 16 is a flowchart representation exemplifying alarm operation of the projector apparatus of FIG. 14.

FIG. 16 is a flowchart representation showing an example of an alarm process. The process is performed in accordance with the following steps:

(S11) a normal projection operation,
(S12) entry detection by the second detection means,
(S13) an alarm process by the second alarm means,
(S14) entry detection by the first detection means, and
(S15) an alarm process by the first alarm means.

First, at the step S11, the light source unit 12 is driven by the regulated voltage from the power source apparatus 52 in FIG. 14, and the image light modulated by the space modulation light generation unit 16 according to the image signal VIDEO is projected from the optical projection unit 30 into the projection area 42 on the screen 40.

Then, the alarm operation advances to the step S12, and the second detection means 82 detects whether the human body or the like enters the second space monitoring area 90S or not. That is, when entry or the existence of the human body or the like is detected, the alarm operation advances to the step S13, and the second alarm means 84 performs an alarm process. As the alarm process, an audio message of the content, for example, "Danger. Please keep away from the projection area." is output (because a viewer can hear the message even in the state in which he or she does not gaze at the projection area 42, the viewer can previously perceive a danger). Accordingly, the person is urged to an evasive action. Incidentally, in addition to the audio message, or independent of the audio message, an image display may be performed in the projection area 42 by the following process. That is, a second alarm signal is outputted from the second alarm means 84 to the overall control unit 66. Then, the overall control unit 66 makes the image signal process unit 62 superpose an alarm message signal or an alarm pattern signal on the image signal VIDEO to output the superposed image signal VIDEO to the driver circuit 64. Thus, the image display is performed through the space modulation light generation unit 16 (Accordingly, the viewer can previously perceive the danger by the alarm display on the projection area 42 and the audio message).

When the entry or the like is continuing despite these alarms, at the next step S14, the first detection means 72 detects the entry into the first space monitoring area 46S. That is, when the entry by the human body or the like or the existence of the human body or the like in the area 46S is detected, the alarm operation advances to the step S15 to perform a first alarm process by the first alarm means 74. For example, the first alarm means 74 cuts off an output voltage of the power source apparatus 52 by the regulator 54 in order to make the laser light from the light source unit 12 be not emitted. Consequently, the eyes of the viewer are protected. It is preferable to output an audio message of the content such as "Danger. The apparatus is stopped." (the reason of the stopping of the projector apparatus can be realized by the viewer).

Incidentally, the first alarm means 74 may reduce the output of the power source apparatus 52 by means of the regulator 54 to reduce the intensity of the laser light to a safe level, and thereby the eyes of the viewer may be protected. At that time, it is preferable to make arrangement for the viewer to understand the reason of the reducing of the projection light by outputting an audio message of content such as "Dangerous for your eyes. The laser light is darkened."

Moreover, when the first alarm means 74 operates, the first alarm means 74 outputs a first alarm signal to the overall control unit 66, and the overall control unit 66 requests an external apparatus, which outputs the image signal VIDEO to stop the outputting of the image signal VIDEO, as the occasion demands. Thus, the projection of the projector apparatus can be stopped.

A restart of the projector apparatus after the first alarm means 74 has operated can be performed by resetting the regulator 54 by an operation of an operator. With regard to the resuming of output of the image signal VIDEO from the external apparatus such as computer equipment or the like, the overall control unit 66 request an image signal to the external apparatus when the projector apparatus is restarted by the operator.

According to the above embodiment, when entry into the second space monitoring area 90S is detected, and further, when entry into the first space monitoring area 46S is detected, the laser light is cut off or the light intensity thereof is reduced. Accordingly, it is possible to take the safety measure without lowering the rate of operation of the projector apparatus in comparison with that of one-step entry detection. Then, before the entry into the first space monitoring area 46S, the entry into the second space monitoring area 90S by the human body can be detected, and an advance alarm can be performed. Consequently, it is possible to prevent the erroneous entering of the human body into the entry prohibition area beforehand.

It is preferable that the first alarm means 74 performs the alarm process when the first detection means 72 detects entry into the first space monitoring area 46S within a prescribed time from the point of time when the second alarm means 84 has operated. Accordingly, the erroneous detection or malfunctions of the first detection means 72, or the influences of noise components at the time of the detection of the first space monitoring area 46S are reduced, and a defect of the reducing of the availability of the projector apparatus owing to frequency operation of the first alarm means 74 can be prevented.

The following forms can be cited as embodiments of the second detection means 82 of the second alarm process unit 80:

(I) a form using a pyroelectric sensor (which is used for detecting entry by the human body in a guard apparatus or the like) for detecting radiation energy emitted by the human body, and (II) a form using a heat detection sensor to be used for a thermography apparatus and the like.

Figure 17:
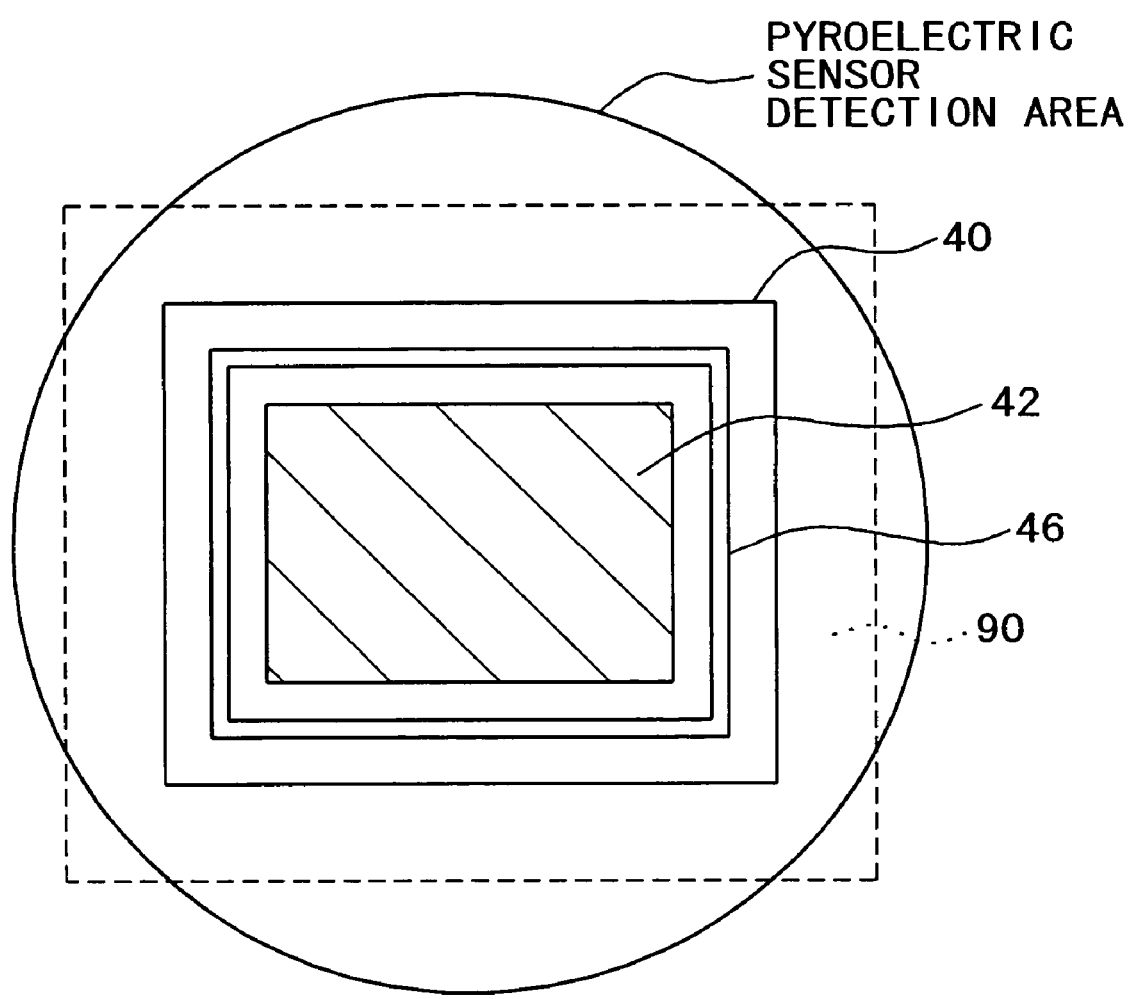
FIG. 17 is an explanatory view exemplifying the detection area of a second detection means with regard to the detection of entry into second monitoring space.
Figure 18:
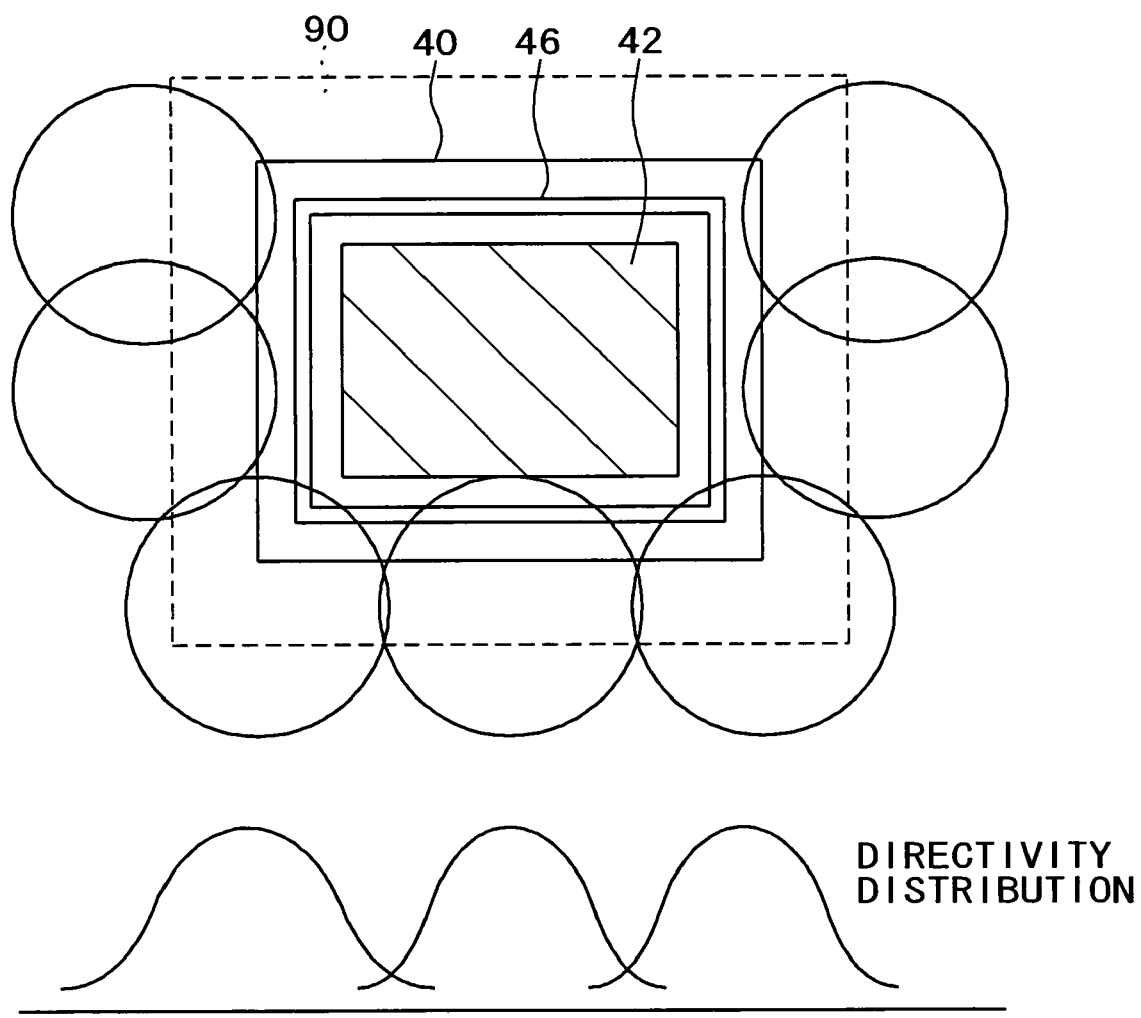
FIG. 18 is an explanatory view exemplifying other detection areas of the second detection means.

With regard to the form (I), for example, the following forms can be cited:

(I-1) a form using a pyroelectric sensor (see FIG. 17), and
(I-2) a form combining a plurality of pyroelectric sensors (see FIG. 18).

First, in the form (I-1), for example, as shown in FIG. 17, as a setting method of the pyroelectric sensor, a pyroelectric sensor having a directive characteristic to an area surrounding almost the whole of the second monitoring area 90 including the screen 40 (the area is shown by a thick line circular frame) can be provided in the neighborhood of the optical projection unit 30. Incidentally, for preventing the frequent operation of the second alarm means 84 caused by malfunctions, noises and the like, the second alarm means 84 may be operated when the pyroelectric sensor continue to detect the human body or the like for a prescribed time or longer (for example, a threshold value for judging the duration is set to about two seconds).

As the first detection means 72, as described above, an image sensor (CCD sensor or the like) can be used. The form in which the image sensor is commonly used by the second detection means 82 is also possible, of course. In that case, an entry state of the first space monitoring area 46S can be also detected by means of a pyroelectric sensor (the pyroelectric sensor functions as the first and the second detection means). Moreover, the detection of entry into the image light passing space area 42S by the human body can be also detected by means of the pyroelectric sensor.

In (I-2) mentioned above, for example, a plurality of pyroelectric sensors having a relatively narrow directivity can be used. A plurality of circular frames shown in FIG. 18 indicates a detection area by each pyroelectric sensor. At the lower part of the drawing, the directivity distributions of the pyroelectric sensors are schematically shown. In the present variation, seven pyroelectric sensors are used. The seven pyroelectric sensors are arranged in the neighborhood of the optical projection unit 30 so as to be directed to the lower part, the right side part and the left side part of the second space monitoring area 90S severally. Incidentally, because it is impossible that a person approaches to the upper part of the second space monitoring area 90S, it is supposed that the necessity for providing pyroelectric sensors directed to the part does not exist.

With regard to the pyroelectric sensors taking charge of the lower part of the second space monitoring area 90S, an example of the intensity distribution of the directivity is shown as three waveforms. However, because not so much strict conditions are required as the directivity, the directivity may be set to be directed to the outside of the first space monitoring area 46S or a region including the area 46S.

In this case also, for evading the frequent operation of the second alarm means 84 owing to malfunctions, noises and the like, the system may be constituted so as to operate the second alarm means 84 when each pyroelectric sensor continues to detect the human body for a prescribed time or longer.

Moreover, when two pyroelectric sensors are combined to be used, for example, when two pyroelectric sensors are parallelly arranged to be coupled and a difference between detected signals by the coupled pyroelectric sensors is calculated, the moving direction of the human body can be detected on the basis of the sign (±) of the difference. The pair of pyroelectric sensors are used as a differential pyroelectric sensor by being arranged to be directed to the lower part, the right side part and the left side part of the second space monitoring area 90S, the human body invading the second space monitoring area 90S can be detected.

Next, the form (II) will be described. By means of a heat detection sensor, the temperature of the human body (a body temperature) is detected to enable the performance of a display, control and the like according to the temperature. For example, when a temperature detected by the heat detection sensor is within the region of a person's body temperature (34-40 degrees), it is judged that the human body exists in the second space monitoring area 90S, and then the second alarm means 84 operates. Incidentally, the detection area of the heat detection sensor can be regulated similarly in the case of the pyroelectric sensor. Moreover, it is also possible to use the heat sensor commonly with the first detection means 72. In this case, a heat detection sensor is provided as the first detection means 72 in the neighborhood of the optical projection unit 30 to detect the human body existing in the first space monitoring area 46S, and further the heat detection sensor can be used to detect the human body existing in the image light passing space area 42S.

Besides, by providing a plurality of heat detection sensors in the neighborhood of the optical projection unit 30, the existence of the human body around the second space monitoring area 90S can be detected.

Next, the following configuration forms of the first detection means 72 will be described:
(i) a form using ultrasonic sensors (see FIG. 19), and
(ii) a form using an optical sensor (see FIG. 20).

Figure 19:
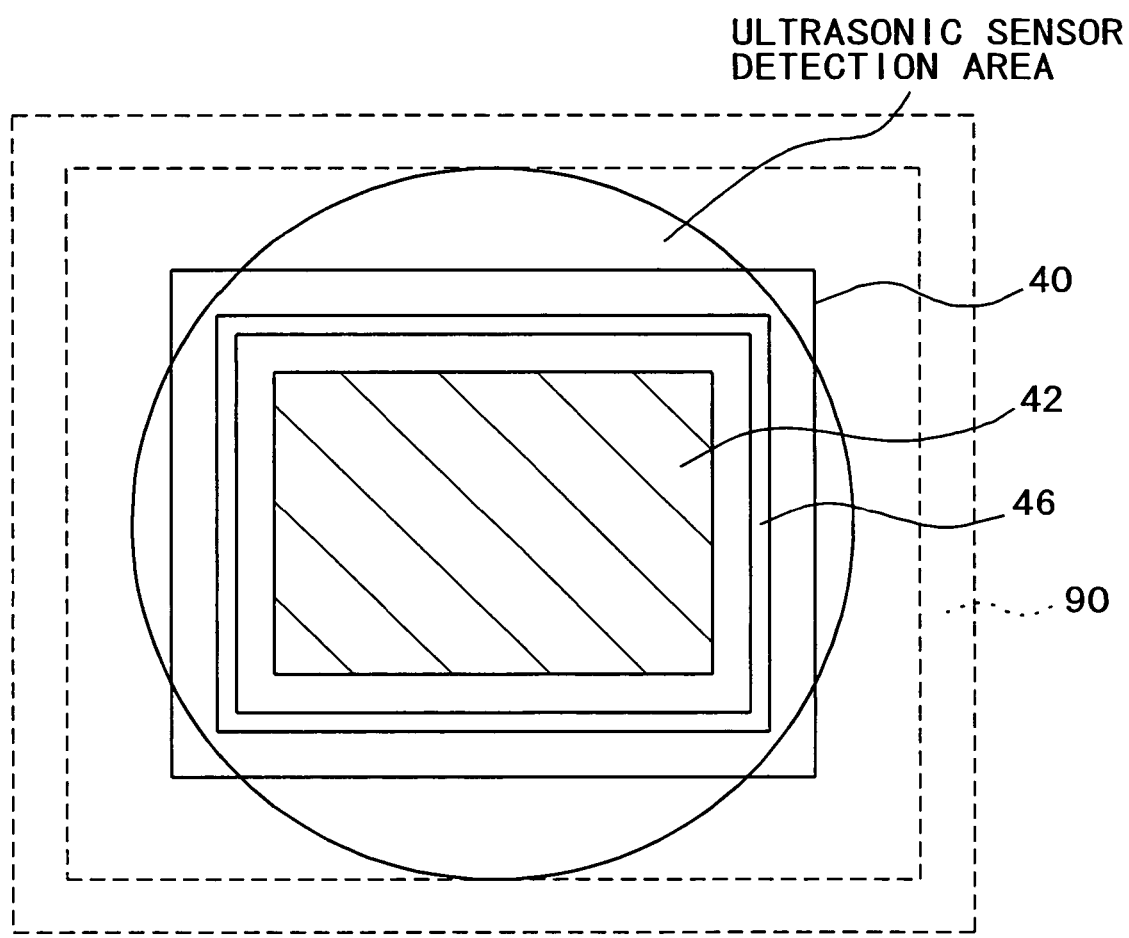
FIG. 19 is an explanatory view exemplifying a detection area in case of using ultrasonic sensors as a first detection means with regard to the detection of entry into first monitoring space.

First, in the form (i), as shown in a circular frame in FIG. 19, a plurality of ultrasonic sensors (for example, about four sensors) which includes the first monitoring area 46 and the first space monitoring area 46S as detection areas, and which does not include the second monitoring area 90 and the second space monitoring area 90S as detection areas is used (each ultrasonic sensor is provided in the neighborhood of the optical projection unit 30). The ultrasonic sensors are equipped with transmission and reception units. By applying a voltage to piezoelectric elements, ultrasonic waves are generated. By receiving ultrasonic waves, electric signals according to the amplitudes of the received ultrasonic waves are outputted. In the state of the nonexistence of entry by the human body or the like, nothing interrupts the ultrasonic waves between the optical projection unit 30 and the screen 40. Then, in this case, ultrasonic waves are outputted from the ultrasonic sensors, and advance to the screen 40 including the first monitoring area 46 of the screen 40. Reflection waves reflected on the screen 40 are received by the ultrasonic sensors. When an object or the human body interrupting the ultrasonic waves exists between the ultrasonic sensors and the first monitoring area 46 or the first space monitoring area 46S, their existence is judged by the reducing of the levels of the reflection waves or the nonexistence of the detection of the reflection wave.

Figure 20:
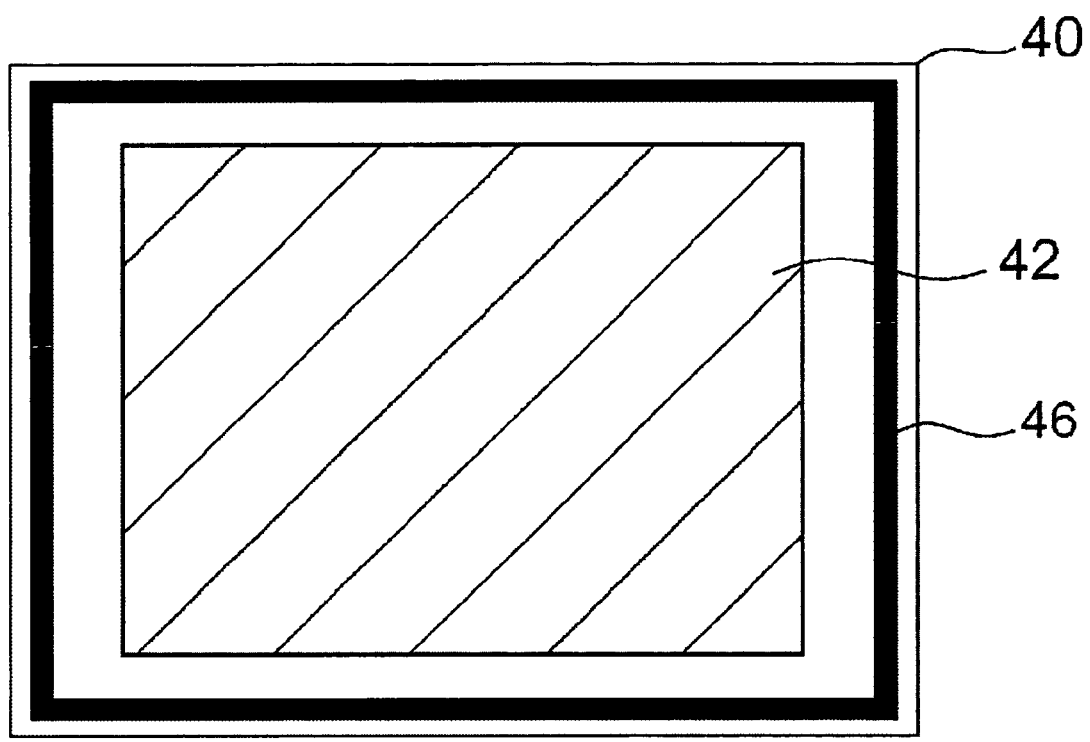
FIG. 20 is an explanatory view showing another example of first detection means.

In the form (ii), for example, as shown in a black thick line rectangular frame in FIG. 20, a photo acceptance unit group such as a plurality of optical sensors, a line-shaped sensor (a linear CCD) or the like is arranged along the first monitoring area 46 of the screen 40. On the other hand, a light-emitting device group (LED or the like) outputting light, infrared rays or the like, which has a sufficiently lower level than the level of the radiation light from the light source unit 12 from the periphery of the optical projection unit 30 toward the first monitoring area 46 is provided on the front surface of the projector apparatus main body unit. Accordingly, an object or the human body interrupting the optical path formed between the light-emitting device group and the photo acceptance unit group can be detected. Alternatively, a configuration form in which a light-emitting device group of infrared rays is arranged in the first monitoring area 46 and the light emitted by the light-emitting device group is detected by optical sensors of the projector apparatus main body unit may be cited.

It is needless to say that various embodiments such as ones using pyroelectric sensors, heat detection sensors or the like, and one using the optical sensors commonly with the second detection means 82 can be adopted.

Incidentally, in the above descriptions, the example in which the first monitoring area 46 is regulated on the outer periphery of the projection area 42 on the screen 40 is exemplified. However, the first monitoring area 46 may be unnecessary to be within the inside of the screen 40 as long as the first monitoring area 46 is located on the outside of the projection area 42. Moreover, the example in which the second monitoring area 90 is located on the outside of the screen 40 is described. However, it is also possible to locate the second monitoring area 90 in the inside of the screen 40 together with the first monitoring area 46.

By the configuration described above, for example, the following advantages can be obtained.

Because a laser light can be cut off or darkened while the human body or an obstacle enters the projection area of the laser light, safety is high.

The detection wave (infrared light or infrared rays) to be used for the entry detection of the human body or an obstacle is invisible to a viewer. Consequently, there is no defect in which the detection wave influences a projection image on the screen to deteriorate the image quality thereof. Moreover, the danger owing to the influence of the detection wave itself to the human body does not exist.

As apparent from the above descriptions, according to the present invention, it is possible to secure the safety to the human body, and to realize the entry detection into the monitoring space simply.

According to the present invention, it is suitable for the miniaturization of an apparatus.

According to the present invention, the precision of detection is sufficiently secured, and no influences to a projected image exist.

According to the present invention, image detection can be surely performed, the width of the monitoring area can be set to the minimum necessary in comparison with the method in which the whole region of the periphery of the screen is monitored, and the detection process is simple and fast.

According to the present invention, a radiation light is regulated to suppress the influences thereof to the human body, and thereby a sufficient safety measure can be taken.

According to the present invention, in the application to an image projection apparatus equipped with optical modulation means, the improvement of safety and reliability is effectively performed.

According to the present invention, by the cutting off of emission light or the stopping of modulation of emission light, a rapid process can be realized.

According to the present invention, by controlling the supply power to the light source, the light intensity can be surely regulated.

According to the present invention, detailed light output level control according to the degree of an entry state can be performed. Moreover, erroneous detection prevention or the like is effectively performed.

According to the present invention, an entry detection process is easy, and does not need any complicated image process and the like.

According to the present invention, because the intensity of a radiation light is suppressed until the safety is confirmed, high safety can be secured.

According to the present invention, by a multi-tiered monitoring system, the safety measure is effectively reinforced.

The invention claimed is:

1. An image projection apparatus comprising a light source and projection unit for performing an image display by projection to a projection area on a screen, and a safety mechanism against entry into a passage area of a radiation light from said projection unit toward said projection area, comprising:

a detection wave source provided on an opposed plane of an apparatus main body unit to said screen or on said screen; and reflection wave detection means for detecting a reflection wave reflected in a monitoring area, which is located on an outside of said projection area at a distance, after a detection wave is emitted from said detection wave source toward said monitoring area, wherein entry into a monitoring space surrounded by said detection wave, which is arranged so as to wholly surround the radiation light that has been emitted from the projection unit, is detected on a basis of a result of a comparison of a detected level by said reflection wave detection means with a threshold value or a reference region, and wherein said reflection wave detection means comprises:
first detection means for detecting said entry into said monitoring space;
second detection means for detecting entry into a monitoring space including an area outside of said monitoring space;
first alarm means for performing an alarm process if said entry is detected by said first detection means; and
second alarm means for performing an alarm process if said entry is detected by said second detection means.

2. The image projection apparatus according to claim 1, wherein said detection wave source or said reflection wave detection means is arranged around said projection unit provided on said opposed plane to said screen.

3. The image projection apparatus according to claim 1, wherein said detection wave is an infrared light or an infrared ray.

4. The image projection apparatus according to claim 3, wherein said reflection wave detection means is composed of an image sensor, and said monitoring area is monitored on a basis of detected image data by said image sensor, and a width of said monitoring area is made to be narrower than an area projected on said screen by said detection wave source.

5. The image projection apparatus according to claim 1, wherein if entry into said monitoring space is detected, a radiation light from said light source to said projection area is cut off or intensity of said radiation light is reduced.

6. The image projection apparatus according to claim 1, further comprising:
optical modulation means for modulating emission light from said light source according to an image signal;
light projection means for projecting said light modulated by said optical modulation means to said projection area on said screen; and
entry detection means for detecting entry into said monitoring space,
wherein, if said entry into said monitoring space is detected by said entry detection means, said radiation light from said light source to said projection area is cut off or intensity of said radiation light is reduced according to an entry state.

7. The image projection apparatus according to claim 6, wherein if said entry into said monitoring space is detected by said entry detection means, light emitted from said light source is cut off.

8. The image projection apparatus according to claim 6, wherein if said entry into said monitoring space is detected by said entry detection means, electric power to be supplied to said light source is reduced or set to be zero.

9. The image projection apparatus according to claim 6, wherein if said entry into said monitoring space is detected by said entry detection means, a drive of said optical modulation means is stopped.

10. The image projection apparatus according to claim 8, wherein said electric power to be supplied to said light source is controlled according to a duration of said entry into said monitoring space or the area of a part entered.

11. The image projection apparatus according to claim 1, wherein said reflection wave detection means measures intensity of said reflection wave from said screen on a basis of respective pixel data of said monitoring area, and compares intensity of detection wave reflected at a time of entry into said monitoring space with reflection intensity from said monitoring area in case of said entry does not exist, and said entry is detected if both of said intensity differ from each other.

12. The image projection apparatus according to claim 1, wherein an image is projected with said intensity of said radiation light reduced to a level safe for the human body until no detection of any entry into said monitoring space is confirmed, and after said confirmation, said intensity of said radiation light rises to a preset level.

13. The image projection apparatus according to claim 1, wherein if said first detection means detects said entry, said radiation light from said light source toward said projection area is cut off or said intensity of said radiation light is reduced to a level which is not dangerous for human body.

14. An image projection method comprising:
  setting a monitoring area, which is located on an outside of a projection area on a screen, for said screen located at a distance from an image projection apparatus;
  emitting a detection wave from a detection wave source provided on a front plane of said image projection apparatus toward said monitoring area;
  detecting entry into a monitoring space surrounded by said detection wave, which is arranged so as to wholly surround the radiation light that has been emitted from the projection unit, by detecting a reflection wave from said monitoring area; and
  cutting off light radiated toward said projection area or reducing intensity of said light according to an entry state;
  setting a first monitoring space including said monitoring area and a passage area through which a detection wave from a front surface of said image projection apparatus to said monitoring area, and a second monitoring space provided on a second monitoring area which is outside of said monitoring area; and
  detecting entry into said monitoring area and said second monitoring area severally to perform an alarm process according to an entry state.

15. The image projection method according to claim 14, wherein infrared light or infrared rays are used as said detection wave.

16. The image projection method according to claim 15, further comprising:
  monitoring said monitoring area having a width narrower than that of said area projected on said screen by said detection wave source on a basis of image data detected by an image sensor.

* * * * *